(12) United States Patent
Iwasaki et al.

(10) Patent No.: US 11,979,440 B2
(45) Date of Patent: May 7, 2024

(54) TEXT DATA TRANSMISSION-RECEPTION SYSTEM, SHARED TERMINAL, AND METHOD OF PROCESSING INFORMATION

(71) Applicants:Ryo Iwasaki, Tokyo (JP); Takuya Imai, Tokyo (JP); Takuro Mano, Kanagawa (JP); Masaaki Kagawa, Tokyo (JP); Hiromasa Koike, Tokyo (JP); Seiya Koura, Kanagawa (JP)

(72) Inventors: Ryo Iwasaki, Tokyo (JP); Takuya Imai, Tokyo (JP); Takuro Mano, Kanagawa (JP); Masaaki Kagawa, Tokyo (JP); Hiromasa Koike, Tokyo (JP); Seiya Koura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/661,086

(22) Filed: Apr. 28, 2022

(65) Prior Publication Data

US 2022/0255975 A1     Aug. 11, 2022

Related U.S. Application Data

(63) Continuation of application No. 17/177,365, filed on Feb. 17, 2021, now Pat. No. 11,349,888.

(30) Foreign Application Priority Data

Mar. 31, 2020  (JP) .................................. 2020-064925
Jan. 13, 2021  (JP) .................................. 2021-003428

(51) Int. Cl.
*G06F 15/16*   (2006.01)
*H04L 65/401*  (2022.01)
(Continued)

(52) U.S. Cl.
CPC .......... *H04L 65/4015* (2013.01); *H04L 67/12* (2013.01); *H04M 3/567* (2013.01); *H04W 4/12* (2013.01)

(58) Field of Classification Search
CPC .... H04L 65/4015; H04L 67/12; H04M 3/567; H04W 4/12
See application file for complete search history.

(56) References Cited

U.S. PATENT DOCUMENTS

2012/0036228 A1*  2/2012  Ichinose ............ H04N 1/00204
                                                   709/219
2014/0101565 A1*  4/2014  Mahieu .................. H04N 21/00
                                                   715/748
(Continued)

FOREIGN PATENT DOCUMENTS

JP     2001-331431     11/2001
JP     2005-197796      7/2005
(Continued)

OTHER PUBLICATIONS

Japanese Office Action for 2021-003428 dated Apr. 12, 2022.

*Primary Examiner* — Normin Abedin
(74) *Attorney, Agent, or Firm* — IPUSA, PLLC

(57) ABSTRACT

A text data transmission-reception system includes a plurality of user terminals; a shared terminal; and an information processing apparatus connectable to each of the plurality of user terminals and the shared terminal via a network. The information processing apparatus includes circuitry configured to receive text data transmitted and received between the plurality of user terminals; determine whether or not the text data transmitted and received between the plurality of user terminals includes a request for controlling the shared
(Continued)

terminal; and control the shared terminal based on a determination that the text data includes the request for controlling the shared terminal.

21 Claims, 39 Drawing Sheets

(51) Int. Cl.
*H04L 67/12* (2022.01)
*H04M 3/56* (2006.01)
*H04W 4/12* (2009.01)

(56) References Cited

U.S. PATENT DOCUMENTS

| | | | |
|---|---|---|---|
| 2017/0255446 A1* | 9/2017 | Malatesha | G06F 3/0488 |
| 2018/0060818 A1 | 3/2018 | Ishiyama et al. | |
| 2018/0063332 A1* | 3/2018 | Ishiyama | H04M 3/42382 |
| 2019/0089838 A1 | 3/2019 | Kagawa et al. | |
| 2019/0306321 A1 | 10/2019 | Kagawa et al. | |
| 2019/0324963 A1 | 10/2019 | Mano | |
| 2019/0327104 A1 | 10/2019 | Kagawa | |
| 2020/0034387 A1 | 1/2020 | Kagawa | |
| 2020/0175991 A1 | 6/2020 | Mano | |
| 2020/0273464 A1 | 8/2020 | Kagawa | |
| 2020/0356722 A1 | 11/2020 | Mano | |

FOREIGN PATENT DOCUMENTS

| | | |
|---|---|---|
| JP | 2017-107529 | 6/2017 |
| JP | 2018-032096 | 3/2018 |
| WO | 2016/178365 | 11/2016 |

* cited by examiner

FIG. 7

USER AUTHENTICATION MANAGEMENT TABLE

| USER ID | USER NAME | ORGANIZATION ID | PASSWORD |
|---|---|---|---|
| u0001 | Taro Ricoh | o1001 | p9991 |
| u0002 | Goro Kondo | o1002 | p9992 |
| ... | ... | ... | ... |

FIG. 8

ACCESS MANAGEMENT TABLE

| ORGANIZATION ID | ACCESS ID | ACCESS PASSWORD |
|---|---|---|
| o1001 | a1001 | p1001 |
| ... | ... | ... |

FIG. 9

SCHEDULE MANAGEMENT TABLE

SCHEDULED EVENT ID: pe0001, CONDUCTED EVENT ID: ee0001

| ORGAN-IZATION ID | USER ID OF RESER-VATION HOLDER | PAR-TICIPA-TION | NAME OF RESER-VATION HOLDER | SCHED-ULED START TIME | SCHED-ULED END TIME | EVENT NAME | USER ID OF OTHER PARTIC-IPANT | PAR-TICIPA-TION | USER NAME OF OTHER PARTICIPANT | FILE DATA |
|---|---|---|---|---|---|---|---|---|---|---|
| o1001 | u0001 | ✓ | Taro Ricoh | 9:00 | 10:00 | Meeting on strategic plan | u0000 | ✓ | Electronic Whiteboard | • XXX.ppt • YYY.xsl ... |
| | | | | | | | u0002 | ✓ | Goro Kondo | |
| | | | | | | | u0003 | ✓ | Yoshio Yamashita | |

FIG. 10

CONDUCTED EVENT MANAGEMENT TABLE

| PROJECT ID | CONDUCTED EVENT ID |
|---|---|
| p0001 | ee0001, ee0011, ee0021 |
| p0002 | ee0002, ee0012 |
| ... | ... |

FIG. 11

CONTENT MANAGEMENT TABLE

CONDUCTED EVENT ID: ee0001

| CONTENT PROCESSING ID | CONTENT PROCESSING TYPE | CONTENT DATA | START DATE/TIME | END DATE/TIME |
|---|---|---|---|---|
| c0001 | Audio Recording | ▫Audio data URL: c://∗∗∗ | 2018/1/15 9:00:00 | 2018/1/15 9:00:30 |
| c0002 | Snapshot | ▫Image data URL: c://∗∗∗ | 2018/1/15 9:00:30 | 2018/1/15 9:00:30 |
| c0003 | Voice text conversion | ▫Text data URL: c://∗∗∗ | 2018/1/15 9:00:00 | 2018/1/15 9:00:30 |
| ∗∗∗ | ∗∗∗ | ∗∗∗ | ∗∗∗ | ∗∗∗ |
| c0201 | Chat | ▫from: u0001<br>▫Mention: u0000<br>▫Message content: screen capture | 2018/1/15 9:44:47 | 2018/1/15 9:44:47 |
| c0202 | Snapshot | ▫Image data URL: c://∗∗∗ | 2018/1/15 9:45:00 | 2018/1/15 9:45:00 |
| c0203 | Chat | ▫from: u0000<br>▫Message content: image data URL: c://∗∗∗ | 2018/1/15 9:45:10 | 2018/1/15 9:45:10 |
| ∗∗∗ | ∗∗∗ | ∗∗∗ | ∗∗∗ | ∗∗∗ |
| c0301 | Chat | ▫from: u0000<br>▫Message content: meeting log data URL: c://∗∗∗ | 2018/1/15 10:00:00 | 2018/1/15 10:00:00 |

FIG. 12

USER AUTHENTICATION MANAGEMENT TABLE

| USER ID | ORGANIZATION ID | PASSWORD |
|---|---|---|
| u0001 | o1001 | p9991 |
| u0002 | o1002 | p9992 |
| ... | ... | ... |

FIG. 13

USER MANAGEMENT TABLE

ORIGINATION ID: o1001

| USER ID | USER NAME |
|---|---|
| u0001 | Taro Ricoh |
| u0002 | Goro Kondo |
| u0003 | Yoshio Yamashita |
| u0004 | Jim Berger |
| ... | ... |

FIG. 14

RESOURCE MANAGEMENT TABLE

ORIGINATION ID: o1001

| RESOURCE ID | RESOURCE NAME |
|---|---|
| s1001 | Conference room X |
| s1002 | Conference room Y |
| ... | ... |

FIG. 15

RESOURCE RESERVATION MANAGEMENT TABLE

ORIGINATION ID: o1001

| RE-SOURCE ID | RESOURCE NAME | USER ID OF SHARED TERMINAL | USER ID OF RESERVATION HOLDER | SCHEDULED USE START DATE/TIME | SCHEDULED USE END DATE/TIME | EVENT NAME |
|---|---|---|---|---|---|---|
| s1001 | Conference room X | u0000 | u0001 | 2018/1/15 9:00 | 2018/1/15 10:00 | Meeting on strategic plan |
| s1001 | Conference room X | u0000 | u0004 | 2018/1/15 10:00 | 2018/1/15 11:00 | Regular meeting |
| s1001 | Conference room X | u0000 | u0002 | 2018/1/15 10:11 | 2018/1/15 15:00 | Management meeting |
| s1002 | Conference room Y | u1000 | u0005 | 2018/1/15 9:00 | 2018/1/15 10:00 | Meeting on new product development |
| ... | ... | ... | ... | ... | ... | ... |

FIG. 16

EVENT MANAGEMENT TABLE

SCHEDULED EVENT ID: pe0001

| ORGAN-IZATION ID | USER ID | USER NAME | SCHEDULED EVENT START DATE/TIME | SCHEDULED EVENT END DATE/TIME | EVENT NAME | MEMO | FILE DATA |
|---|---|---|---|---|---|---|---|
| o1001 | u0000 | Electronic Whiteboard | 2018/1/15 9:00 | 2018/1/15 10:00 | Meeting on strategic plan | ××× | ·XXX.ppt<br>·YYY.xsl<br>· |
| o1001 | u0001 | Taro Ricoh | 2018/1/15 9:00 | 2018/1/15 10:00 | Meeting on strategic plan | ××× | |
| o1001 | u0002 | Goro Kondo | 2018/1/15 9:00 | 2018/1/15 10:00 | Meeting on strategic plan | ××× | |
| o1001 | u0003 | Yoshio Yamashita | 2018/1/15 9:00 | 2018/1/15 10:00 | Meeting on strategic plan | ××× | |
| ··· | ··· | ··· | ··· | ··· | ··· | ··· | |

FIG. 17

SERVER AUTHENTICATION MANAGEMENT TABLE

| ACCESS ID | ACCESS PASSWORD |
|---|---|
| a1001 | p1001 |
| a1002 | p1002 |
| ... | ... |

FIG. 18

PROJECT MEMBER MANAGEMENT TABLE

ORGANIZATION ID: o1001

| PROJECT ID | PROJECT NAME | USER ID OF PROJECT MEMBER |
|---|---|---|
| p0001 | Plan for next year | u0000, u0001, u0002, u0003 |
| p0002 | R&D project | u0000, u0004, u0005 |
| p0003 | New product development | u0000, u0005, u0006, u0007 |
| ... | ... | ... |

FIG. 19

CONDUCTED EVENT RECORD MANAGEMENT TABLE

PROJECT ID: p0001, CONDUCTED EVENT ID: ee0001

| CONTENT PROCESSING ID | CONTENT PROCESSING TYPE | CONTENT DATA | START DATE/TIME | END DATE/TIME |
|---|---|---|---|---|
| c0001 | Audio Recording | ▪ Audio data URL: c://··· | 2018/1/15 9:00:00 | 2018/1/15 9:00:30 |
| c0002 | Snapshot | ▪ Image data URL: c://··· | 2018/1/15 9:00:30 | 2018/1/15 9:00:30 |
| c0003 | Voice text conversion | ▪ Text data URL: c://··· | 2018/1/15 9:00:00 | 2018/1/15 9:00:30 |
| ··· | ··· | ··· | ··· | ··· |
| c0201 | Chat | ▪ from: u0001<br>▪ Mention: u0000<br>▪ Message content: screen capture | 2018/1/15 9:44:47 | 2018/1/15 9:44:47 |
| c0202 | Snapshot | ▪ Image data URL: c://··· | 2018/1/15 9:45:00 | 2018/1/15 9:45:00 |
| c0203 | Chat | ▪ from: u0000<br>▪ Message content: image data URL: c://··· | 2018/1/15 9:45:10 | 2018/1/15 9:45:10 |
| ··· | ··· | ··· | ··· | ··· |
| c0301 | Chat | ▪ from: u0000<br>▪ Message content: meeting log data URL: c://··· | 2018/1/15 10:00:00 | 2018/1/15 10:00:00 |

FIG. 20

CONDUCTED EVENT MANAGEMENT TABLE

| CONDUCTED EVENT ID | EVENT NAME | START DATE/TIME | END DATE/TIME |
|---|---|---|---|
| ee0001 | Meeting on strategic plan | 2018/1/15 9:00 | 2018/1/15 10:00 |
| ee0002 | Regular meeting | 2018/1/15 10:00 | 2018/1/15 11:00 |
| ... | ... | ... | ... |

FIG. 21

RELATED INFORMATION MANAGEMENT TABLE

PROJECT ID: p0001, CONDUCTED EVENT ID: ee0001

| CONTENT GENERA- TION TIME | RECORDED AUDIO/VIDEO DATA | | | VOICE-TEXT DATA | | | IMAGE DATA | | |
|---|---|---|---|---|---|---|---|---|---|
| | CONTENT PROCESS- ING ID | CONTENT PROCESS- ING TYPE | CONTENT ID | CONTENT PROCESSING TYPE | SEQUENCE NO. | CONTENT PROCESS- ING ID | CONTENT PROCESSING TYPE | SEQUENCE NO. | |
| 00:00 | c0001 | Audio Recording | c0002 | Voice-text conversion | 1 | --- | --- | --- | |
| 00:30 | c0004 | Audio Recording | c0005 | Voice-text conversion | 2 | c0003 | Snapshot | 1 | |
| 01:00 | c0007 | Audio Recording | c0008 | Voice-text conversion | 3 | c0006 | Snapshot | 2 | |
| ... | ... | ... | ... | ... | ... | ... | ... | ... | |
| 24:30 | c0202 | Video Recording | c0203 | Voice-text conversion | 61 | c0199 | Snapshot | 60 | |
| ... | ... | ... | ... | ... | ... | ... | ... | ... | |
| 59:30 | c0298 | Video Recording | c0299 | Voice-text conversion | 93 | c0297 | Snapshot | 92 | |

FIG. 25

| | 02 Mon. | 03 Tue. | 04 Wed. | 05 Thr. | 06 Fri. | | |
|---|---|---|---|---|---|---|---|
| | 7 AM: Office work Notification withdrawing Consultation | 7 AM: Office work | 7 AM: Office work | All day remote work 7 AM: Office work | Remote work day 7 AM: Office work | | |
| 12 AM | | | | | | | |
| 1 AM | | | | | | | |
| 2 AM | | | | | | | |

| MESSAGE CONTENT | OPERATION CONTENT |
|---|---|
| ATTACH FILE | DISPLAY ATTACHED FILE |
| CAPTURE SCREEN | CAPTURE SCREEN AND POST TO CHAT |
| VIEW SCREEN | SHARE SCREEN DISPLAYED ON SHARED TERMINAL |
| VIEW CAMERA IMAGE | SHARE CAMERA IMAGE DISPLAYED ON SHARED TERMINAL |
| END MEETING | POST TO CHAT OF MEETING LOG |

FIG. 40
(a)
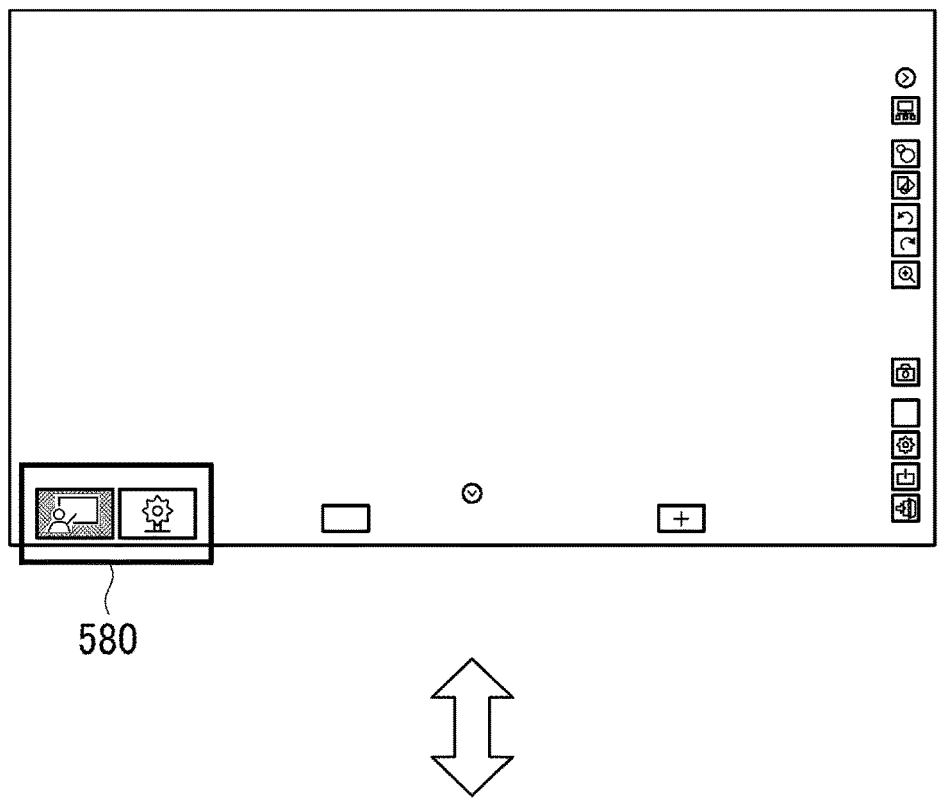
(b)
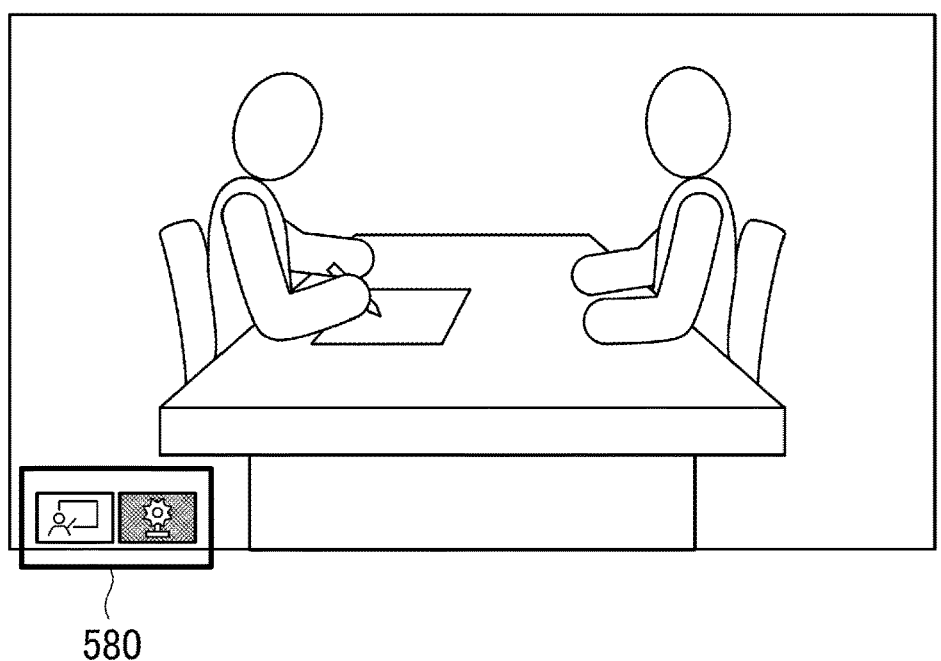

TEXT DATA TRANSMISSION-RECEPTION SYSTEM, SHARED TERMINAL, AND METHOD OF PROCESSING INFORMATION

CROSS-REFERENCE TO RELATED APPLICATION

The present application is a continuation application of U.S. patent application Ser. No. 17/177,365, filed on Feb. 17, 2021 and is based on and claims priority to Japanese Patent Application Nos. 2020-064925, filed on Mar. 31, 2020, and 2021-003428, filed on Jan. 13, 2021 in the Japan Patent Office, the disclosure of which are incorporated by reference herein in its entirety.

BACKGROUND

Technical Field

This disclosure relates to a text data transmission-reception system, a shared terminal, and a method of processing information.

Background Art

Teleconference systems or remote conference systems, in which interactive whiteboards and computers are connected via a network, are known. Conventional teleconference systems have a function of storing or managing audio data acquired during a conference, captured images of electronic information board, various types of data (e.g., text data of chat) received from terminal devices, or the like as log data of conference or meeting.

Further, tools such as collaboration tools for assisting or supporting collaborative work performable by a group have been developed and used, in which the tools provide various functions, such as communication function and information sharing function, to a plurality of users who work as a group or team. For example, a plurality of users who work as a group or team for a collaborative work or collaboration work can use communication function, such as chat function and voice communication function, and information sharing function of the collaboration tool to hold an online meeting. When the online meeting using the communication function is performed, a plurality of users who work together as a group or a team can store or save various data, such as data transmitted and received using the chat function during the online meeting and audio/video data recorded using the audio recording/video recording function, as log data of conference or meeting.

However, when to display a particular file on a shared terminal (e.g., electronic information board) participating a particular event (e.g., online meeting) or when to share or capture a screen displayed on the shared terminal (e.g., electronic information board) participating the particular event (e.g., online meeting), a user participating the event (e.g., online meeting) has to directly operate the shared terminal at a conference room where the shared terminal is disposed, which is not convenient for the user.

SUMMARY

As one aspect of the present disclosure, a text data transmission-reception system is devised. The text data transmission-reception system includes a plurality of user terminals; a shared terminal; and an information processing apparatus connectable to each of the plurality of user terminals and the shared terminal via a network. The information processing apparatus includes circuitry configured to receive text data transmitted and received between the plurality of user terminals; determine whether or not the text data transmitted and received between the plurality of user terminals includes a request for controlling the shared terminal; and control the shared terminal based on a determination that the text data includes the request for controlling the shared terminal.

As another aspect of the present disclosure, a shared terminal connectable to a plurality of user terminals and an information processing apparatus via a network is devised. The shared terminal includes circuitry configured to receive text data transmitted and received between the plurality of user terminals; determine whether or not the received text data includes a request for controlling the shared terminal; and control the shared terminal based on a determination that the text data includes the request for controlling the shared terminal.

As another aspect of the present disclosure, a method of processing information performable by a user terminal connectable to a shared terminal, an information processing apparatus, and another user terminal via a network is devised. The method includes receiving an input of text data to be transmitted to the another user terminal; determining whether or not the received text data includes a request for controlling the shared terminal; and requesting, to the information processing apparatus, for controlling the shared terminal based on a determination that the text data includes the request for controlling the shared terminal.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 7 is an example of schematic diagram of a user authentication management table;

FIG. 8 is an example of schematic diagram of an access management table;

FIG. 9 is an example of schematic diagram of a schedule management table;

FIG. 10 is an example of schematic diagram of a conducted event management table;

FIG. 11 is an example of schematic diagram of a content management table;

FIG. 12 is an example of schematic diagram of a user authentication management table;

FIG. 13 is an example of schematic diagram of a user management table;

FIG. 14 is an example of schematic diagram of a resource management table;

FIG. 15 is an example of schematic diagram of a resource reservation management table;

FIG. 16 is an example of schematic diagram of an event management table;

FIG. 17 is an example of schematic diagram of a server authentication management table;

FIG. 18 is an example of schematic diagram of a project member management table;

FIG. 19 is an example of schematic diagram of a conducted event record management table;

FIG. 20 is an example of schematic diagram of a conducted event management table;

FIG. 21 is an example of schematic diagram of a related information management table;

FIG. 25 is an example of schedule screen;

FIG. 40 is examples of a display screen of a shared terminal and a camera image;

The accompanying drawings are intended to depict embodiments of this disclosure and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such teams as first, second, etc. may be used herein to describe various elements, components, regions, layers and/or units, it should be understood that such elements, components, regions, layers and/or units are not limited thereby because such twins are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description is given of one or more embodiments with reference to the drawings, but the present invention is not limited to embodiments described in this description. In this description, a group or team of users gathering for performing a collaborative work or collaboration work is referred to as a project, and each user belonging to the project is referred to as a member of project or project member. Further, in this description, "file" may indicate "electronic file".

First Embodiment (System Configuration)

Figure 1:
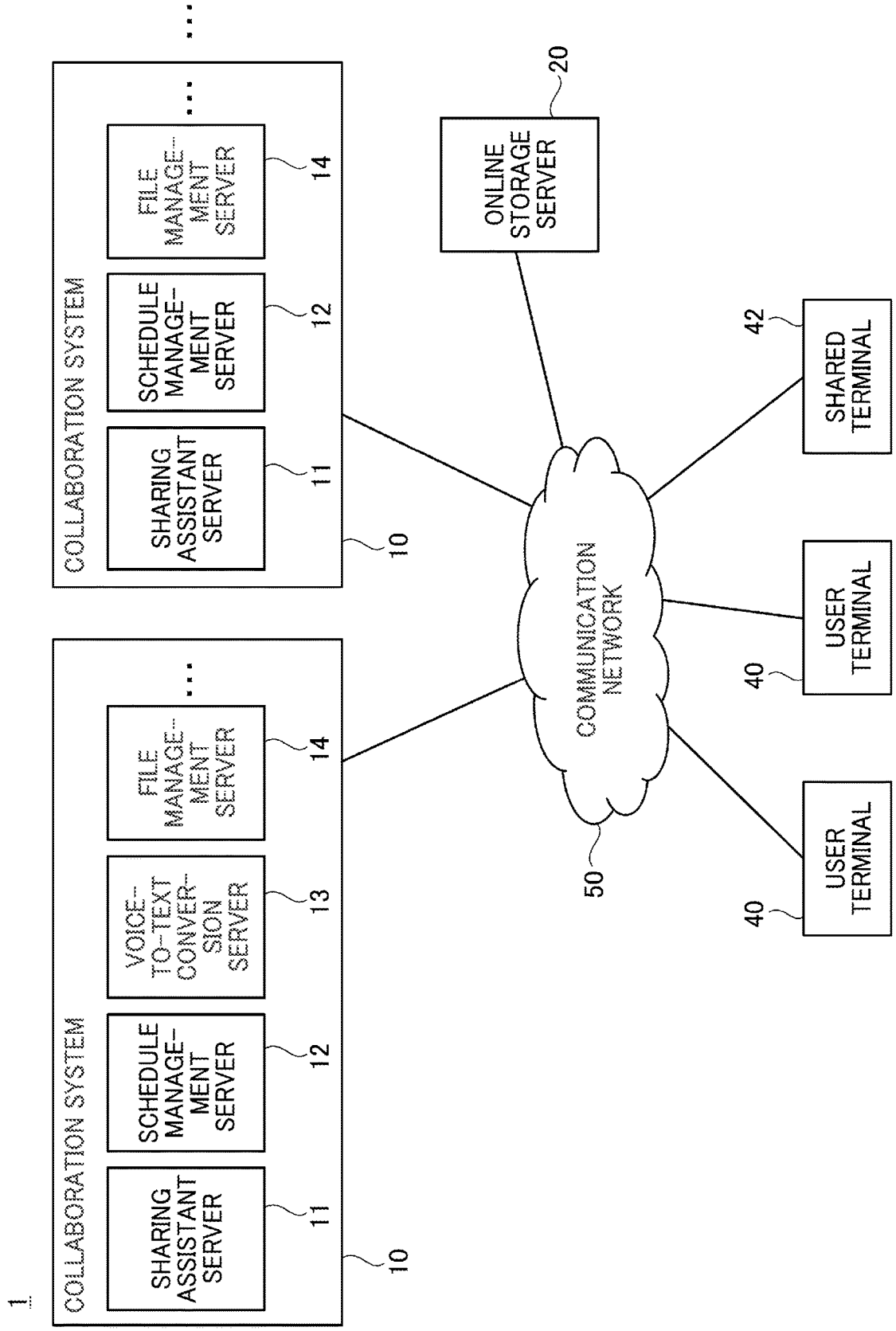
FIG. 1 is an example of system configuration of an information processing system according to a first embodiment.

FIG. 1 is an example of system configuration of an information processing system 1 according to a first embodiment. As illustrated in FIG. 1, the information processing system 1 includes, for example, a collaboration system 10, an online storage server 20, one or more user terminals 40, and a shared terminal 42 communicably connected to each other via a communication network 50.

The communication network 50 is constructed, for example, by the Internet, a mobile communication network, local area network (LAN) or the like. The communication network 50 may include not only wired communication but also a wireless communication network such as 3rd Generation (3G), Worldwide Interoperability for Microwave Access (WiMAX) or Long Term Evolution (LTE).

The collaboration system 10 is a system that assists or supports a plurality of persons or users to perform one work together. For example, the collaboration system is a system that is used to perform voice call, video call, chat, screen sharing (projection), information sharing, review of agenda, preparation and compilation of reference materials, schedule setting, determination of action item, or the like, using personal computer (PC), portable terminal, electronic information board (e.g., electronic whiteboard), projector, conference tool, or the like, in a place where persons gather to discuss and share opinions, consultation, or the like for a specific purpose (including a case where persons gather at the same physical place, and a case where persons are physically separated but user terminals are connected to each other via a network).

The collaboration system 10 has the same meaning as the collaboration work assistance or supporting system. The collaboration work assistance or supporting system is a system that assists or supports a plurality of persons to perform one work together. For example, the collaboration work assistance or supporting system provides a communication function, an information sharing function, or the like. The collaboration system 10 provides various collaboration tools to assist or support a collaboration work or collaboration work performable by project members. Each collaboration tool is a unit, function, or tool to be used for assisting or supporting a plurality of persons who work together to accomplish one work or job. The collaboration tool include various functions, such as communication function, scheduling function (schedule management), information sharing function, and action item management function. The collaborative work or collaboration work means that a plurality of persons perform one work together.

Further, the collaboration tools provided by a plurality of collaboration systems 10 may not be the same functions. Therefore, in an example case of FIG. 1, the server configuration of the two collaboration systems 10 are different. A sharing assistant server 11 (or sharing support server 11) included in the collaboration system 10 provides various functions, such as communication function, and information sharing function, to each project member.

A schedule management server 12 included in the collaboration system 10 provides a schedule management function to each project member.

A voice-to-text conversion server 13 included in the collaboration system 10 converts voice data of each project member into text data.

A file management server 14 included in the collaboration system 10 saves one or more files uploaded by each project member during an online meeting or the like. By using the file management server 14, each project member can share the one or more files.

Further, the online storage server 20 provides an online storage service to each user. The online storage service is a service for allowing a user to rent a disk drive (storage area) on the cloud, which can be used, for example, via the Internet. By using the online storage service, each project member can share the one or more files.

The user terminal 40, which is an example of information processing terminal, is operated by a user, such as project member. The user can use the collaboration system 10, the online storage server 20, and the shared terminal 42 from the user terminal 40.

The user terminal 40 may be, an apparatus having a communication function, such as projector (PJ), interactive whiteboard (IWB) having electronic board function that can communicate with each other, output device such as a digital signage, head up display (HUD) device, industrial machine, imaging device, sound collecting device, medical device, network appliance, connected car, personal computer, portable telephone, smart phone, tablet terminal, game machine, personal digital assistant (PDA), digital camera, wearable PC, and desktop PC.

The shared terminal 42 is an information processing terminal, which is shared by a plurality of persons, such as an electronic information board installed in a conference room or the like. The shared terminal 42 may be, an apparatus having a communication function, such as projector (PJ), interactive whiteboard (IWB) having electronic board function that can communicate with each other, output device such as a digital signage, head up display (HUD) device, industrial machine, imaging device, sound collecting device, medical device, network appliance, connected car, personal computer, portable telephone, smart phone, tablet terminal, game machine, personal digital assistant (PDA), digital camera, wearable PC, and desktop PC. For example, the shared terminal 42 installed in a conference room or the like can be shared by a plurality of persons by requesting a reservation of each terminal and conference room for use.

Further, the sharing assistant server 11, the schedule management server 12, the voice-to-text conversion server 13, and the file management server 14 can be implemented by, for example, one or more information processing apparatuses. Further, the collaboration system 10 may be one or more computers, in which a part or all of the functions of the sharing assistant server 11, the schedule management server 12, the voice-to-text conversion server 13, and the file management server 14 are integrated.

Further, one or more functions of the sharing assistant server 11, the schedule management server 12, the voice-to-text conversion server 13, and the file management server 14 can be distributed over a plurality of computers.

Further, the sharing assistant server 11, the schedule management server 12, the voice-to-text conversion server 13, and the file management server 14 may be implemented by computers in a cloud environment or computers in an on-premise environment. As described above, the information processing system 1 illustrated in FIG. 1 is just one example.

Further, the collaboration system 10, the sharing assistant server 11, the schedule management server 12, the voice-to-text conversion server 13, the file management server 14, and the online storage server 20 are not limited to PCs as long as these apparatuses have the communication function.

Further, each of the collaboration system 10, the sharing assistant server 11, the schedule management server 12, the voice-to-text conversion server 13, the file management server 14, and the online storage server 20 may be, for example, projector (PJ), interactive whiteboard (IWB), output device such as a digital signage, head up display (HUD) device, industrial machine, imaging device, sound collecting device, medical device, network appliance, connected car, personal computer, portable telephone, smart phone, tablet terminal, game machine, personal digital assistant (PDA), digital camera, wearable PC, and desktop PC.

Further, the collaboration information provided by the collaboration system 10 to each project member by the collaboration tool includes, for example, synchronous collaboration information and asynchronous collaboration information.

The synchronous collaboration information is information that is exchanged in real time in a place (e.g., meeting), in which persons gather to discuss and share opinions or consult for a specific purpose. The synchronous collaboration information is, for example, voice call, video call, screen shared by PC/portable terminal/electronic information board (e.g., electronic whiteboard), or the like (including text and diagrams input from PC, portable terminal, or the like, and handwritten input contents to a screen of electronic information board).

Further, the asynchronous collaboration information is information that is input or shared on the network. The asynchronous collaboration information includes, for example, information that can be shared and referenced by participants before and after an event (e.g., meeting) where persons gather to discuss and share opinions or consult for a specific purpose. The asynchronous collaboration information includes, for example, chat, message, content, scheduling, action item, content of audio recording/video recording, or the like.

These terms are included in Conference Solutions Report, "Magic Quadrant for Meeting Solution", published in September 2019, by Gartner, Inc.

(Hardware Configuration)

Figure 2:
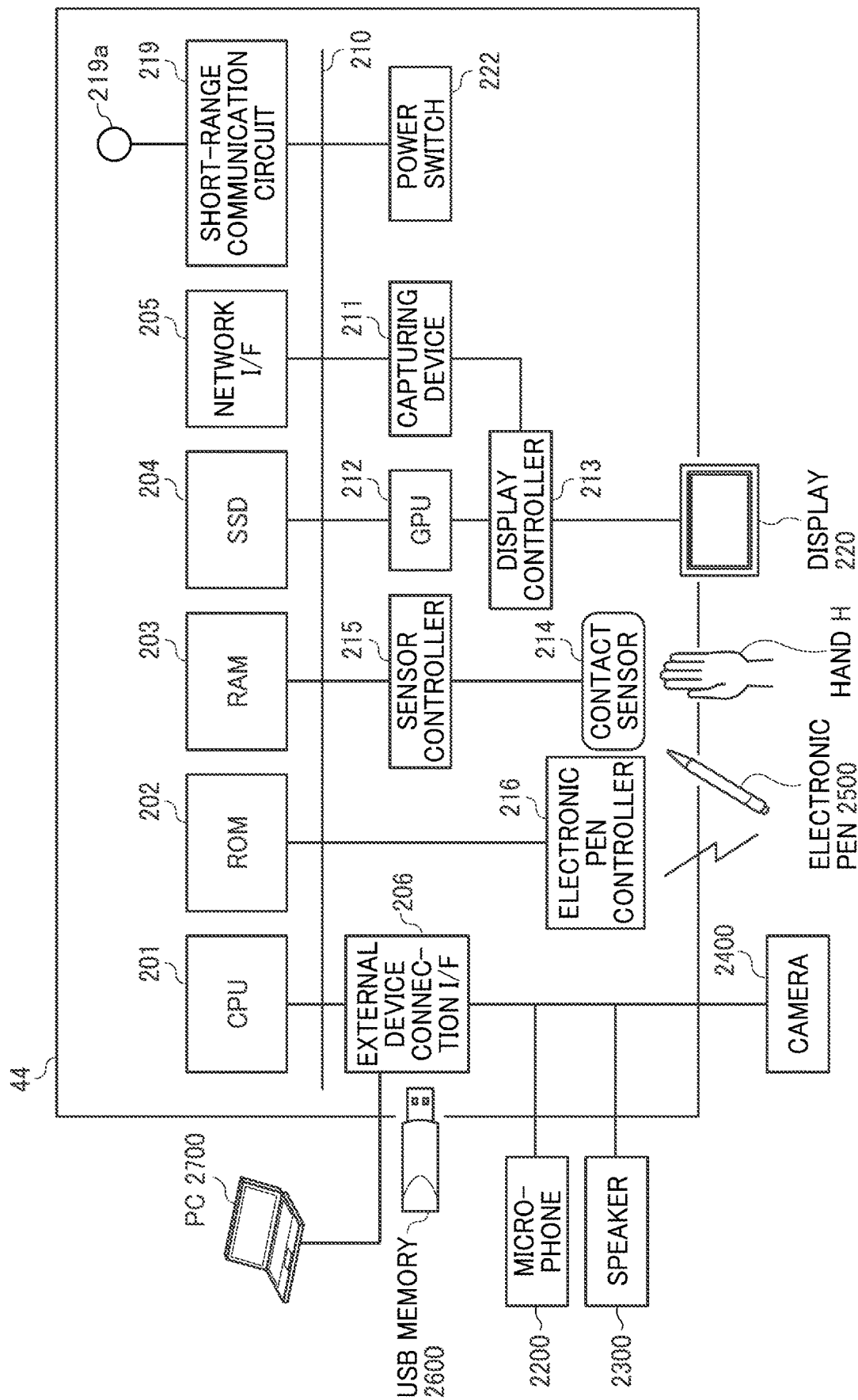
FIG. 2 is an example of hardware block diagram of an electronic information board according to the first embodiment.

If the shared terminal 42 illustrated in FIG. 1 is an electronic information board, the shared terminal 42 can employ a hardware configuration illustrated in FIG. 2. FIG. 2 is an example of hardware block diagram of the shared terminal 42 according to the embodiment. As illustrated in FIG. 2, the shared terminal 42 includes, a central processing unit (CPU) 201, a read only memory (ROM) 202, a random access memory (RAM) 203, a solid state drive (SSD) 204, a network interface (I/F) 205, and an external device connection I/F 206.

The CPU 201 controls the operation of the shared terminal 42, such as the electronic information board entirely. The ROM 202 stores programs used for driving the CPU 201, such as an initial program loader (IPL). The RAM 203 is used as a work area of the CPU 201. The SSD 204 stores various data, such as programs for the electronic information board.

The network I/F 205 controls communication with the communication network 50. The external device connection I/F 206 controls communication with a universal serial bus (USB) memory 2600, a personal computer (PC) 2700, and external devices, such as microphone 2200, speaker 2300, and camera 2400.

The shared terminal 42 further includes, for example, a capturing device 211, a graphics processing unit (GPU) 212, a display controller 213, a contact sensor 214, a sensor controller 215, an electronic pen controller 216, a short-range communication circuit 219, an antenna 219a of the short-range communication circuit 219, and a power switch 222.

The capturing device 211 acquires image data displayed on the display 220, which is an example of a display unit (display device), via the display controller 213, and stores the image data in the RAM 203 or the like.

The GPU 212 is a semiconductor chip dedicated for processing graphics.

The display controller 213 controls and manages a screen display in order to output an image output from the capturing device 211 or the GPU 212 to the display 220 or the like.

The contact sensor 214 detects that the electronic pen 2500, the user hand H, or the like has contacted the display 220. The sensor controller 215 controls processing of the contact sensor 214. The contact sensor 214 performs an input of coordinates and detection of coordinates using the infrared ray blocking method. As to the method of inputting coordinates and detecting coordinates, two light emission-reception devices disposed at the upper end corners of the display 220 radiate infrared rays parallel to the display 220, and the infrared rays are reflected by reflective members disposed around the display 220, and then the two light emission-reception receive the light beams coming from the optical path, which is the optical path of the light emitted by the two light emission-reception device.

The contact sensor 214 outputs identification (ID) of the infrared ray emitted by the two light emission-reception devices and blocked by an object to the sensor controller 215. The sensor controller 215 specifies or identifies a coordinate position where the object contacts on the display 220. By communicating with the electronic pen 2500, the electronic pen controller 216 determines whether or not a pen tip or pen end touches the display 220. In this description, some devices and controllers can be configured using one or more circuits.

The short-range communication circuit 219 is a communication circuit, such as near field communication (NFC) and Bluetooth (registered trademark). The power switch 222 is a switch for switching ON-OFF of power supply to the electronic information board.

The shared terminal 42 further includes, for example, a bus line 210. The bus line 210 is an address bus and a data bus for electrically connecting each of the components, such as the CPU 201 illustrated in FIG. 2.

Further, the contact sensor 214 can use not only the infrared blocking system, but also various detection means, such as a touch panel of electrostatic capacitance type that identifies a contact position by detecting a change in capacitance, a touch panel of resistance film type that identifies a contact position based on a voltage change of two resistive films, and a touch panel of electromagnetic induction type that detects a contact position by detecting the electromagnetic induction caused by a contact of an object on the touch panel.

Further, the electronic pen controller 216 can determine whether a user grip portion of the electronic pen 2500 or other portion of the electronic pen 2500 touches the display 220 in addition to the pen tip and pen end of the electronic pen 2500.

Figure 3:
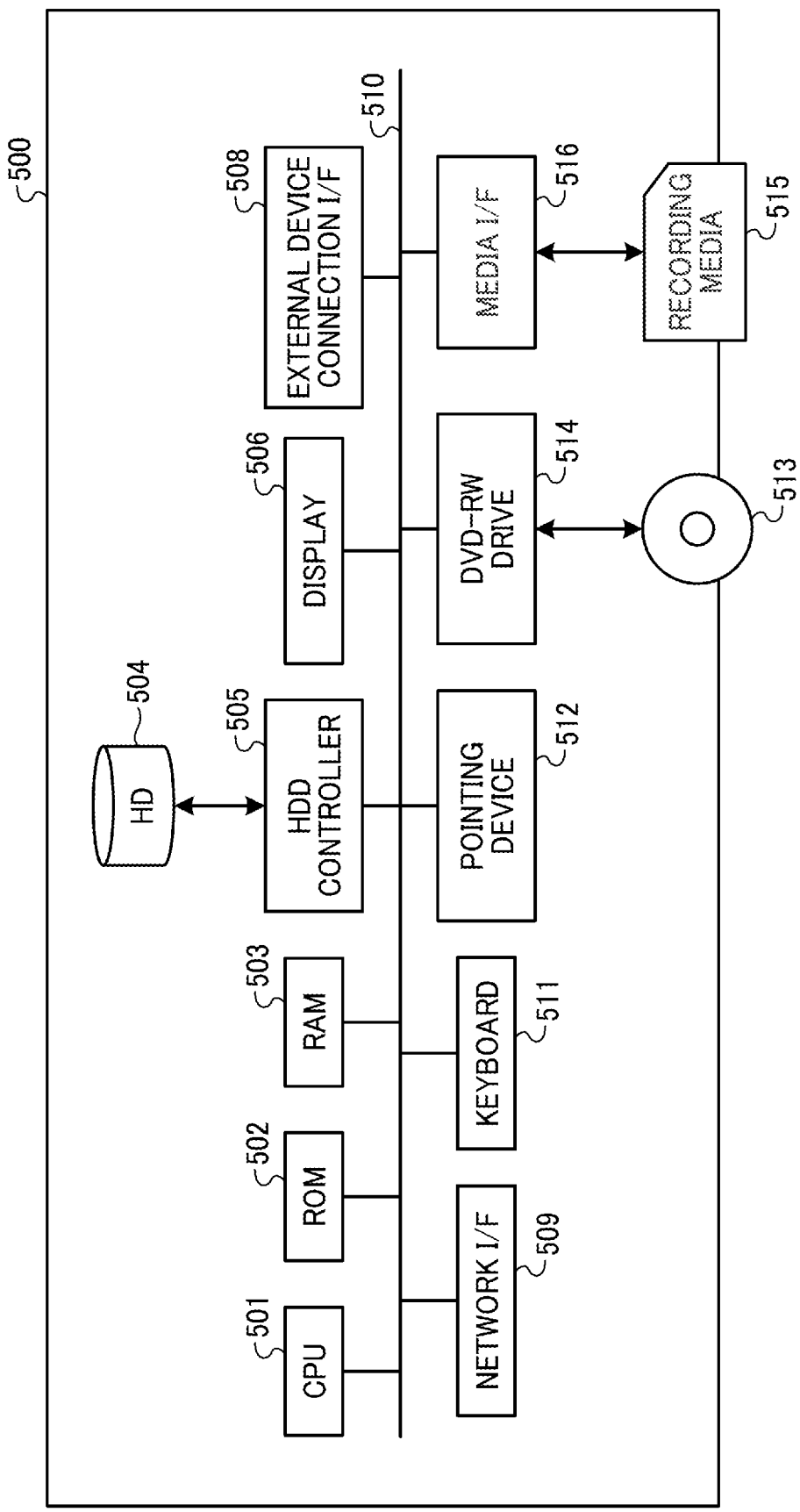
FIG. 3 is an example of hardware block diagram of a computer according to a first embodiment.

The collaboration system 10, the sharing assistant server 11, the schedule management server 12, the voice-to-text conversion server 13, the file management server 14, and the online storage server 20 illustrated in FIG. 1 are implemented by, for example, a computer 500 having a hardware configuration illustrated in FIG. 3. Further, if the user terminal 40 illustrated in FIG. 1 is a PC, the user terminal 40 is implemented, for example, by the computer 500 having a hardware configuration illustrated in FIG. 3. FIG. 3 is an example of hardware block diagram of the computer 500 according to the embodiment.

As illustrated in FIG. 3, the computer 500 includes, for example, a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a data bus 510, a keyboard 511, a pointing device 512, a digital versatile disk rewritable (DVD-RW) drive 514, and a media UF 516.

The CPU 501 controls the operation of the computer 500 entirely in accordance with one or more programs. The ROM 502 stores programs for driving the CPU 501, such as initial program loader (IPL). The RAM 503 is used as a work area of the CPU 501.

The HD 504 stores various data, such as programs. The HDD controller 505 controls reading or writing of various data from or to the HD 504 under the control of the CPU 501.

The display 506 displays various information, such as cursor, menu, window, character, text, or image.

The external device connection I/F 508 is an interface for connecting various external devices. In this case, the external device is, for example, a universal serial bus (USB) memory or a printer. The network I/F 509 is an interface for performing data communication using the communication network 50. The bus line 510 is an address bus and a data bus for electrically connecting each component, such as the CPU 501 illustrated in FIG. 3.

The keyboard 511 is a type of input unit including a plurality of keys for inputting characters, letters, numbers, and various instructions.

The pointing device 512 is a type of input unit for selecting or executing various instructions, selecting processing target, moving a cursor, or the like.

The DVD-RW drive 514 controls reading or writing of various data from or to the DVD-RW 513, which is as an example of removable recording medium. Further, the removable recording medium may be digital versatile disk recordable (DVD-R) in addition to DVD-RW. The media I/F 516 controls reading or writing (storing) of data from or to a recording medium 515, such as flash memory.

Further, each of the above described programs may be recorded on a computer-readable recording medium in an installable form or an executable form and distributed. Examples of the recording medium include compact disc recordable (CD-R), digital versatile disk (DVD), Blu-Ray (registered trademark) disc, and secure digital (SD) card. Further, the recording medium can be provided to a country or a foreign country as a program product.

(Software Configuration)

Hereinafter, with reference to FIG. 4, a description is given of computer software installed on the shared terminal 42. The computer software (hereinafter referred to as "software") is a program related to an operation of computer and other information used for processing by the computer, which is equivalent to the program. The program is an instruction to the computer, which is a combination of instructions to obtain one result.

Further, the term of "program-equivalent" is not a program because the "program-equivalent" is not a direct command to the computer. The term of "program-equivalent" is similar to the program because the "program-equivalent" specifies the computer processing. For example, a data structure (a logical structure of data represented by a mutual relationship between data elements) is equivalent to the program.

Further, an application is a generic name of software used for performing a specific process in the software classification. On the other hand, an operating system (hereinafter referred to as OS) is a software for controlling a computer and making computer resources available to applications or the like. The OS performs basic management and control of computer such as input/output control, management of hardware such as memory and hard disk, and process management. The applications operate using the functions provided by the OS.

Figure 4:
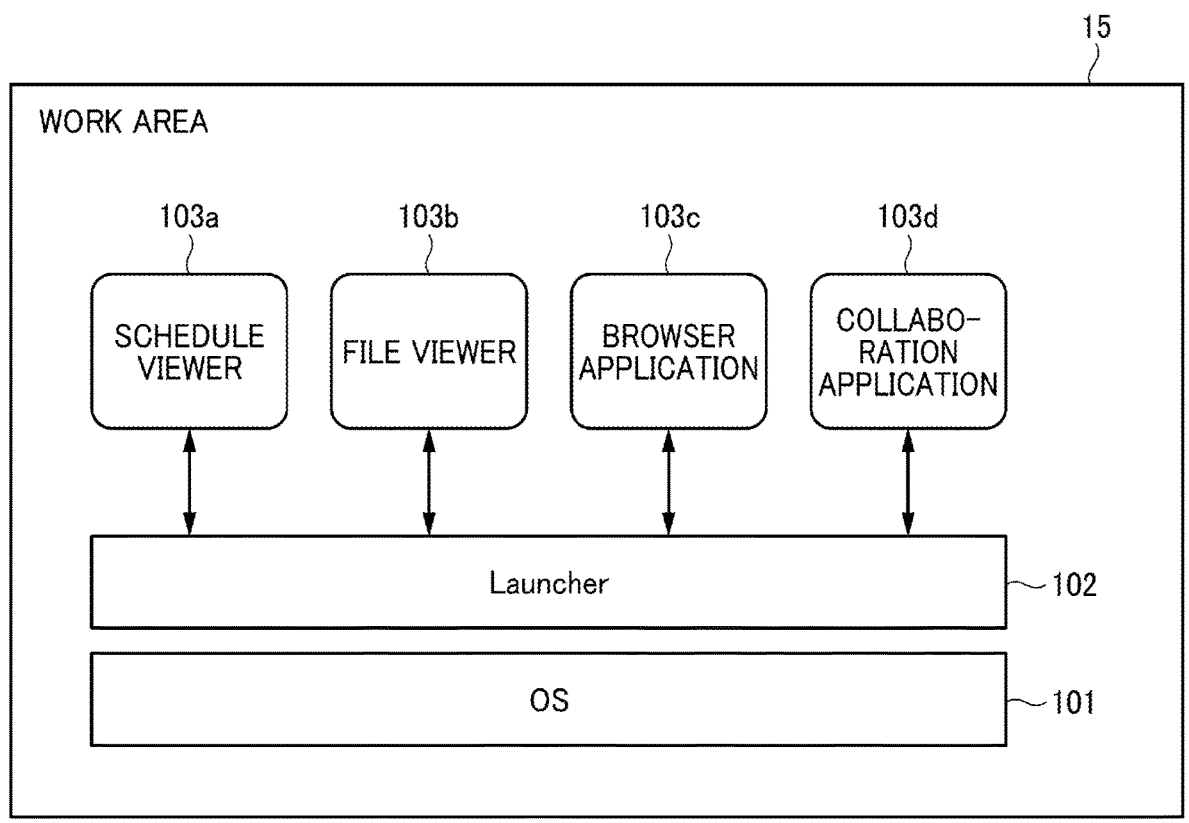
FIG. 4 is an example of software configuration of a shared terminal.

FIG. 4 is a diagram illustrating a software configuration of the shared terminal 42. As illustrated in FIG. 4, OS 101, Launcher 102, schedule viewer 103a, file viewer 103b, browser application 103c, and collaboration application 103d operate on a work area 15 of the RAM 203.

The OS 101 is basic software that provides basic functions of the shared terminal 42, and manages or controls the shared terminal 42 entirely.

The Launcher 102 is a launcher application that operates on the OS 101. The Launcher 102 manages or controls, for example, a start and end of event executed or conducted by the electronic information board, and external applications, such as the schedule viewer 103a, the file viewer 103b, the browser application 103c, and the collaboration application 103d being used during the execution of the event.

The event is a place where persons gather directly or via the communication network 50 and provides opinions, presentations, consultations, or the like for a specific purpose, such as conference, meeting, public gathering, private gathering, consultation, in-person meeting, larger conference, seminar, webinar (online seminar), academic workshop, policy presentation, or the like.

The schedule viewer 103a, the file viewer 103b, the browser application 103c, and the collaboration application 103d are external applications running or operating on the Launcher 102 (hereinafter, referred to as external application 103 when there is no need to distinguish these applications from each other). The external application 103 executes processing independently of the Launcher 102, and executes services or functions provided on the OS 101.

Although FIG. 4 indicates an example, in which four external applications 103, such as the schedule viewer 103a, the file viewer 103b, the browser application 103c, and the collaboration application 103d are installed on the electronic information board, the number of external applications 103 is not limited to four. Further, the schedule viewer 103a, the file viewer 103b, the browser application 103c, and the collaboration application 103d may be downloaded and installed from, for example, a server provided in the collaboration system 10 or the like, or a server provided in the cloud or on-premises.

Figure 5:
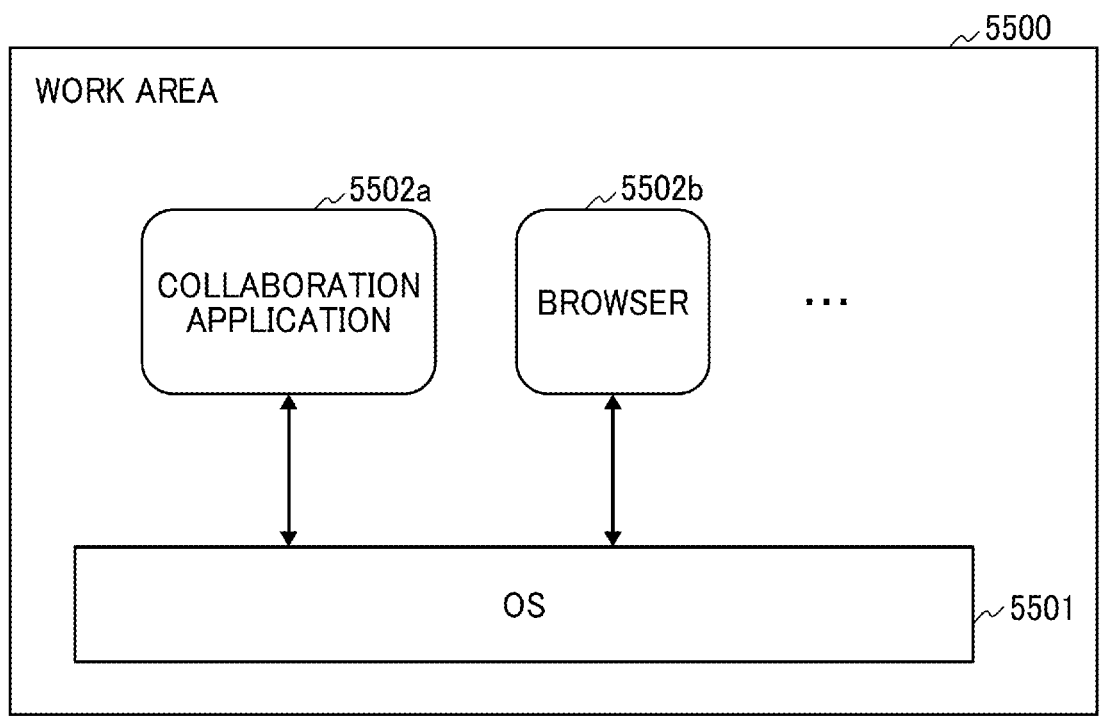
FIG. 5 is an example of software configuration of a user terminal.

Hereinafter, with reference to FIG. 5, a description is given of software installed on the user terminal 40. FIG. 5 is a diagram illustrating a software configuration of the user terminal 40. As illustrated in FIG. 5, OS 5501, collaboration application 5502a, and browser 5502b operate on a work area 5500 of the RAM 503. The OS 5501 is basic software that provides basic functions of user terminal 40, and manages or controls the user terminal 40 entirely.

The collaboration application 5502a and the browser 5502b are external applications running or operating on the OS 5501 (hereinafter referred to as external application 5502 when there is no need to distinguish these applications from each other). The external application 5502 executes services or functions provided on the OS 5501. Although FIG. 5 indicates an example in which two external applications 5502, such as the collaboration application 5502a and the browser 5502b, are installed on the user terminal 40, but the number of applications is not limited thereto. The number of external applications 5502 installed on the user terminal 40 may be other than two. Further, the collaboration application 5502a and the browser 5502b may be downloaded and installed from, for example, a server provided in the collaboration system 10 or the like, or a server provided in the cloud or on-premises.

(Functional Configuration)

Figure 6:
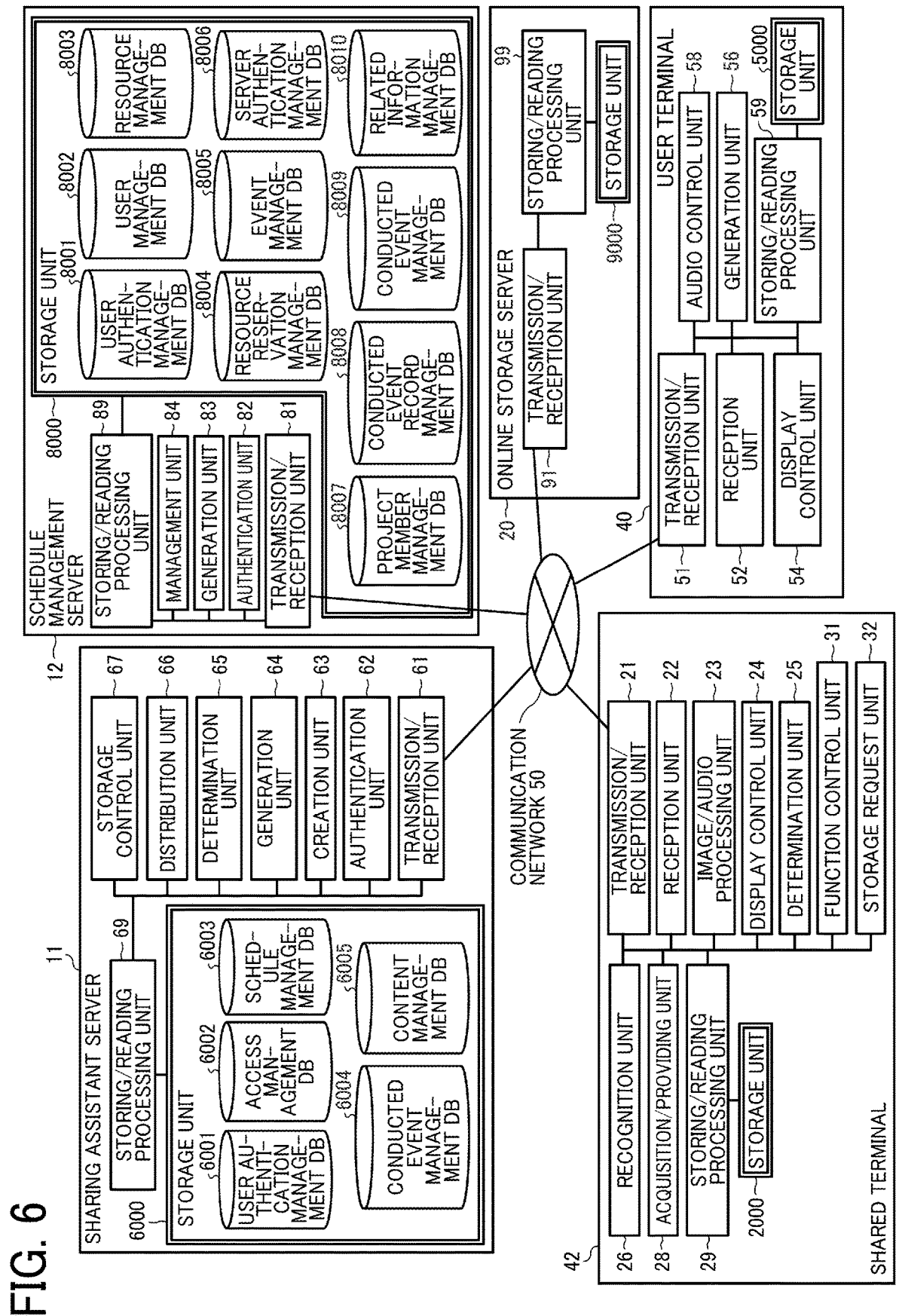
FIG. 6 is an example of functional block diagram of an information processing system according to the first embodiment.

The information processing system 1 according to the embodiment is implemented, for example, by a functional configuration as illustrated in FIG. 6. FIG. 6 is an example of functional block diagram of the information processing system 1 according to the embodiment. FIG. 6 appropriately omits some functional unit not necessary for the description of the first embodiment.

(Functional Configuration of Shared Terminal)

As illustrated in FIG. 6, the shared terminal 42 used as the electronic information board includes, for example, a transmission/reception unit 21, a reception unit 22, an image/audio processing unit 23, a display control unit 24, a determination unit 25, a recognition unit 26, an acquisition/providing unit 28, a storing/reading processing unit 29, a function control unit 31, and a storage request unit 32. Each of the functional units of the electronic information board is a function or means implemented by any one of the components illustrated in FIG. 2 under the instructions from the CPU 201 executing programs loaded on the RAM 203 from the SSD 204. Further, the shared terminal 42 includes a storage unit 2000, implemented by the RAM 203, the SSD 204, or the USB memory 2600 illustrated in FIG. 2.

(Functional Configuration of Shared Terminal)

Hereinafter, with reference to FIG. 6, a description is given of each functional unit of the shared terminal 42.

The transmission/reception unit 21, which is implemented by the instructions from the CPU 201 and the network I/F 205 and the external device connection I/F 206 illustrated in FIG. 2, transmits and receives various data or information to and from other terminal, apparatus or system via the communication network 50. The transmission/reception unit 21 is an example of transmission unit and reception unit.

The reception unit 22, which is implemented mainly by the instructions from the CPU 201 and the contact sensor 214 and the electronic pen controller 216 illustrated in FIG. 2, receives various inputs from a user. The reception unit 22 is an example of reception unit.

The image/audio processing unit 23, which is implemented by the instructions from the CPU 201 and the capturing device 211 illustrated in FIG. 2, stores image data displayed on the display 220. Further, the image/audio processing unit 23, which is implemented by the instructions from the CPU 201 and the GPU 212 illustrated in FIG. 2, performs image processing for displaying an image on the display 220. Further, the image/audio processing unit 23 performs image processing on image data obtained by the camera 2400 that captures an image of an object.

Further, after the microphone 2200 converts voice of a user into audio signal, the image/audio processing unit 23 performs audio processing on audio data related to the audio signal. Further, the image/audio processing unit 23 outputs an audio signal related to the audio data to the speaker 2300, and instructs the speaker 2300 to output voice. Further, the image/audio processing unit 23 performs processing for converting drawn image data, obtained by drawing an image on the display 220 with the electronic pen 2500 or the hand H by a user, into coordinate data.

The display control unit 24, which is implemented by the instructions from the CPU 201 and the display controller 213 illustrated in FIG. 2, displays a drawn image on the display 220, and accesses the sharing assistant server 11 and the schedule management server 12 using a web browser to display various screen data. Specifically, the display control unit 24 activates and executes the Launcher 102 running or operating on the OS 101 (see FIG. 4) and the external application 103 to instruct the display 220 to display various screens drawn by an application programming interface (API) provided by the OS 101. The display control unit 24 is an example of display control unit.

The determination unit 25, which is implemented by the instructions from the CPU 201 illustrated in FIG. 2, performs various determinations. For example, the determination unit 25 determines whether a user who has transmitted a message using the chat function participates the same online meeting using the shared terminal 42.

The recognition unit 26, which is implemented by the instructions from the CPU 201 illustrated in FIG. 2, recognizes a designated area, which is a surrounded area, on the display 220.

The acquisition/providing unit 28, which is implemented by the instructions from the CPU 201 and the short-range communication circuit 219 and the antenna 219a illustrated in FIG. 2, acquires and provides data with a terminal, such as integrated circuit (IC) card or smartphone, using short-range communication.

The function control unit 31 receives a control request from a user based on an operation of user, and controls the function based on the control request. Further, the function control unit 31 receives a control request from a user based on a message using the chat function, to be described later, and controls the function based on the control request. For example, when a request for screen capture is received from a user participating the same online meeting, the function control unit 31 controls the capture function to capture a display screen. Further, for example, when a message attached with a file is received from a user who is participating the same online meeting, the function control unit 31 displays the attached file.

After ending the online meeting, the storage request unit 32 requests the sharing assistant server 11 to store the shared data that was used during the online meeting. The shared data indicates various information that was used during an event (e.g., online meeting), and includes, for example, files, image data of shared screen, recorded video data, recorded audio data, stroke data, pointer data, chat data, or the like.

Further, during a period of holding or performing an online meeting (e.g., from a start to end of the meeting, when a meeting is being performed), the storage request unit 32 can be configured to request the sharing assistant server 11 to store the shared data being used in the online meeting. If the number or capacity of shared data is greater or larger, by starting a saving or storing the shared data from a given time during the online meeting, the shared data can be completely stored or saved when the online meeting ends or immediately after ending the online meeting.

The storing/reading processing unit 29, which is implemented by the instructions from the CPU 201 and the SSD 204 illustrated in FIG. 2, stores various data in the storage unit 2000 and reads various data stored in the storage unit 2000.

Further, when image data and/or audio data are received from another shared terminal 42, the user terminal 40 or the like using communication, the image data and/or audio data are overwritten and stored in the storage unit 2000 every time image data and audio data are received. Among the received image data and audio data, image data before being overwritten is displayed as an image on the display 220, and audio data before being overwritten is output from the speaker 2300 as voice.

(Functional Configuration of User Terminal)

As illustrated in FIG. 6, the user terminal 40 includes, for example, a transmission/reception unit 51, a reception unit 52, a display control unit 54, a request unit 55, a generation unit 56, an audio control unit 58, and a storing/reading processing unit 59. Each of the functional units of the user terminal 40 is a function or means implemented by any one of the components illustrated in FIG. 3 under the instructions from the CPU 501 executing programs loaded on the RAM 503 from the HD 504. Further, the user terminal 40 includes a storage unit 5000, implemented by the HD 504 illustrated in FIG. 3.

(Functional Configuration of User Terminal)

Hereinafter, with reference to FIG. 6, a description is given of each functional unit of the user terminal 40.

The transmission/reception unit 51, which is implemented by the instructions from the CPU 501 and the network I/F 509 illustrated in FIG. 3, transmits and receives various data or information to and from other terminal, apparatus, or system via the communication network 50. The transmission/reception unit 51 is an example of transmission unit and reception unit.

The reception unit 52, which is implemented mainly by the instructions from the CPU 501 and the keyboard 511 and the pointing device 512 illustrated in FIG. 3, receives various input from a user. The reception unit 52 is an example of reception unit.

The display control unit 54, which is implemented by the instructions from the CPU 501 illustrated in FIG. 3, displays an image on the display 506, and accesses the sharing assistant server 11 or the schedule management server 12 using the browser 5502*b* to display images of various screen data. Specifically, the display control unit 54 accesses the sharing assistant server 11 or the schedule management server 12, for example, by activating and executing the collaboration application 5502*a* or the browser 5502*b* running or operating on the OS 5501 illustrated in FIG. 5.

Then, the display control unit 54 downloads WebApplication (WebAPP) including at least HyperText Markup Language (HTML), and Cascading Style Sheets (CSS), JAVASCRIPT (registered trademark), or the like, and instructs the display 506 to display various image data generated by the WebAPP. For example, the display control unit 54 instructs the display 506 to display image data generated by "HTML5" including data expressed using a given format, such as Extensible Markup Language (XML), JavaScript Object Notation (JSON), or Simple Object Access Protocol (SOAP) format. The display control unit 54 is an example of display control unit.

The generation unit 56, which is implemented by an instruction from the CPU 501 illustrated in FIG. 3, has a function of generating image data of various screens to be displayed on the display 506. The generation unit 56 generates the image data of various screens using the content data received by the transmission/reception unit 51. For example, the generation unit 56 renders text data, which is content data, and generates image data related to the text data, which is content data, to display the rendered data. The rendering is a process of interpreting data written in a web page description language (e.g., HTML, CSS, XML), and calculating an arrangement of characters, image data, or the like actually displayed on a screen.

The audio control unit 58 which is implemented by the instructions from the CPU 501 illustrated in FIG. 3, has a function of outputting sound signal from a speaker. The audio control unit 58 sets sound data to be output from the speaker, and reproduces the sound data by outputting sound signals related to the set sound data from the speaker.

The storing/reading processing unit 59, which is implemented by the instructions from the CPU 501 and the HDD controller 505 illustrated in FIG. 3, stores various data in the storage unit 5000 and reads various data from the storage unit 5000.

(Functional Configuration of Sharing Assistant Server)

As illustrated in FIG. 6, the sharing assistant server 11 includes, for example, a transmission/reception unit 61, an authentication unit 62, a creation unit 63, a generation unit 64, a determination unit 65, a distribution unit 66, a storage control unit 67, and a storing/reading processing unit 69. Each of the functional units of the sharing assistant server 11 is a function or means implemented by any one of the components illustrated in FIG. 3 under the instructions from the CPU 501 executing programs loaded on the RAM 503 from the HD 504. Further, the sharing assistant server 11 includes a storage unit 6000, implemented by the HD 504 illustrated in FIG. 3.

(User Authentication Management Table)

FIG. 7 is an example of schematic diagram of a user authentication management table. The storage unit 6000 includes a user authentication management database (DB) 6001 configured by the user authentication management table illustrated in FIG. 7. The user authentication management table stores or manages user ID identifying each user, user name, organization ID identifying each organization to which each user belongs, and password in association with each other. Further, the organization ID includes a domain name representing a group or organization managing a plurality of computers connected on the communication network 50.

(Access Management Table)

FIG. 8 is an example of schematic diagram of an access management table. The storage unit 6000 includes an access management DB 6002 configured by the access management table illustrated in FIG. 8. The access management table stores or manages organization ID, access ID, and access password required for authentication when accessing the schedule management server 12 in association with each other. The access ID and access password are required for the sharing assistant server 11 to use a service or function provided by the schedule management server 12 via a web application programming interface (WebAPI) or the like using a given protocol, such as Hypertext Transfer Protocol (HTTP) or Hypertext Transfer Protocol Secure (HTTPS).

The schedule management server 12 stores and manages a plurality of schedulers. Since different organizations may use different schedulers, the management using the access management table illustrated in FIG. 8 is required.

(Schedule Management Table)

FIG. 9 is an example of schematic diagram of a schedule management table. The storage unit 6000 includes a schedule management DB 6003 configured by the schedule management table illustrated in FIG. 9. The schedule management table stores or manages organization ID, user ID of reservation holder, participation or absence of reservation holder, reservation holder name (user name), scheduled start time, scheduled end time, event name, user ID of other participant, participation or absence of other participant, other participant name (user name), and file data in association with each other for each scheduled event ID and conducted event ID.

The scheduled event ID is identification information identifying each scheduled or reserved event. The scheduled event ID is an example of scheduled event identification information identifying each event to be conducted.

The conducted event ID is identification information identifying each event that was actually conducted or each event that is being conducted among the scheduled or reserved events.

The conducted event ID is an example of conducted event identification information identifying each conducted event or each being-conducted event.

The reservation holder name is a name of a person who has reserved a shared resource, such as a conference room. The shared resource is an object, service, space (room), place, or information that can be used by a plurality of persons or a group. The conference room is an example of shared resource that is shared by a plurality of users. If the shared resource is a conference room, the reservation holder name is, for example, a name of organizer or host.

The scheduled start time indicates a scheduled use start time of shared resource. The scheduled end time indicates a scheduled use end time of shared resource. The event name indicates a name of each event scheduled to be conducted by the reservation holder.

Hereinafter, the "shared resource" may be simply referred to as the "resource" to simplify the expression in this description.

The user ID of other participant is identification information identifying each participant other than the reservation holder.

The other participant name is a name of each participant other than the reservation holder. That is, in this example case, the user can include the shared terminal 42, which is an example of resource, in addition to the reservation holder and other participant.

The file data is file data of reference file to be used in each event corresponding to the scheduled event ID registered by a user. The file data is data that is created using various applications and a given file format. The file format of file data is, for example, a file for presentation software, a file for spread sheet software, or the like.

(Conducted Event Management Table)

FIG. 10 is an example of schematic diagram of a conducted event management table. The storage unit 6000 includes a conducted event management DB 6004 configured by the conducted event management table illustrated in FIG. 10. The conducted event management table stores or manages conducted event ID in association with each project ID.

The project ID is identification information identifying each project (e.g., project identification information). The project represents a group, team, or grouping of users configured to achieve a particular goal, plan, project, or the like.

Each user who is a member belonging to the same project can share the shared data such as the minutes of event associated with the project ID as the conducted event record. The shared data indicates various information that was used during an event (e.g., online meeting), and includes, for example, files, image data of shared screen, recorded video data, recorded audio data, stroke data, pointer data, chat data, or the like.

The project ID is allocated to each project. Further, the project ID may be also referred to as group ID or team ID.

(Content Management Table)

FIG. 11 is an example of schematic diagram of a content management table. The storage unit 6000 includes a content management DB 6005 configured by the content management table illustrated in FIG. 11. The content management table stores or manages content processing ID, type of content processing (content processing type), material of content (content data), and start date/time and end date/time of content processing in association with each other for each conducted event ID. In this description, the date may mean day (e.g., day of month, day of week) and time (e.g., 10 AM, 10:00-10:30 AM).

The content is shared data that was generated during an event (e.g., online meeting) in a particular project (e.g., content of conducted event, or reference materials used in conducted event). The type of content processing includes, for example, audio-recording, video-recording, file sharing, screen sharing, snapshot, voice-to-text conversion, generation of action item, chatting, uploading reference materials, handwriting operation or manipulation, pointing device operation or manipulation.

Further, the content processing ID is identification information identifying each content processing that was generated in each event.

The snapshot is a process of acquiring a display screen at a certain time point in an event being conducted, as image data. The snapshot is also referred to, for example, capture or image recognition.

If the content processing type is "audio recording", the material of content (content data) includes, for example, universal resource locator (URL) indicating a storage destination of the recorded audio data.

Further, if the content processing type is "snapshot", the material of content (content data) includes, for example, URL indicating a storage destination of image data of a screen acquired by the snapshot (capture). The capture means saving of image (e.g., still image, movie image) displayed on the display 506 as image data. If the content processing type is "voice-to-text conversion", the material of content (content data) includes, for example, URL indicating a storage destination of text data of the received voice data. The text data is text information exchanged between users participating an event. For example, the text information includes text input by each user who participates an event, data obtained by converting voice-input content into text, character data included in a file exchanged by each user in an event, mention included in text manually input by each user or comment input by voice of each user, or the like.

If the content processing type is "chat", the material of content (content data) includes, for example, user ID of participant who has posted a message, user ID of other party (mention) if other party (mention) is designated, and message content. The message is information exchanged between users who have participated an event.

For example, the message includes text input by each user, comment input by voice of each user, data obtained by converting an input by voice into text, file exchanged by users during an event, mention included in text manually input by each user or comment input by voice, or the like. The message having a designated mention is a message to be notified to a plurality of participants, and designating one or more persons to whom a message sender requests to read the message, among the plurality of participants. Further, the message content includes, for example, not only text data of posted message but also files of posted image data and log data of meeting.

The action item indicates a content of action, which occurs in each event (e.g., meeting) in each project and is required to be performed or executed by one or more persons related to each event. If the content processing type is "action item generation", the material of content (content data) includes, for example, user ID of execution person of action item, due date for completing action item, and URL indicating a storage destination of text data indicating the content of action item.

If the content processing type is "video-recording", the material of content (content data) includes, for example, URL indicating a storage destination of the recorded video data.

If the content processing type is "file sharing", the material of content (content data) includes, for example, URL indicating a storage destination of file data that was shared by each participant of an event (e.g., online meeting).

If the content processing type is "screen sharing", the material of content (content data) includes, for example, URL indicating a storage destination of image data or recorded video data of a screen that was shared by each participant of an event (e.g., online meeting).

(Functional Configuration of Sharing Assistant Server)

Hereinafter, with reference to FIG. 6, a description is given of each functional unit of the sharing assistant server 11. In the following description, each functional unit of the sharing assistant server 11, among the components illustrated in FIG. 3, the relationship with the main components for implementing each functional unit of the sharing assistant server 11 is to be also described.

The transmission/reception unit 61 of the sharing assistant server 11 illustrated in FIG. 6 is implemented by the instructions from the CPU 501 illustrated in FIG. 3 and the network I/F 509 illustrated in FIG. 3. The transmission/reception unit 61 transmits and receives various data or information to and from the user terminal 40, the shared terminal 42, other server, other system, or the like via the communication network 50. The transmission/reception unit 61 is an example of transmission unit or reception unit.

The authentication unit 62, which is implemented by the instructions from the CPU 501 illustrated in FIG. 3, performs authentication by determining whether information (e.g., user ID, organization ID, and password) transmitted from the user terminal 40 or the shared terminal 42 matches information registered in the user authentication management DB 6001 in advance.

The creation unit 63, which is implemented by the instructions from the CPU 501 illustrated in FIG. 3, creates, for example, image data of various screens in addition to image data of reservation list screen based on reservation information and schedule information transmitted from the schedule management server 12.

The generation unit 64, which is implemented by the instructions from the CPU 501 illustrated in FIG. 3, generates conducted event ID, content processing ID, and URL of storage destination.

The determination unit 65, which is implemented by the instructions from the CPU 501 illustrated in FIG. 3, performs various determinations. The various determinations will be described later.

The distribution unit 66, which is implemented by the instructions from the CPU 501 illustrated in FIG. 3, provides a chat function to each participant of an online meeting or the like.

The control request unit 67, which is implemented by the instructions from the CPU 501 illustrated in FIG. 3, requests a control request to the shared terminal 42 based on an operation content requested by a chat message, to be described later.

The storing/reading processing unit 69, which is implemented by the instructions from the CPU 501 illustrated in FIG. 3 and the HDD controller 505 illustrated in FIG. 3, stores various data in the storage unit 6000 and reads out various data stored in the storage unit 6000.

(Functional Configuration of Schedule Management Server)

As illustrated in FIG. 6, the schedule management server 12 includes, for example, a transmission/reception unit 81, an authentication unit 82, a generation unit 83, a management unit 84, and a storing/reading processing unit 89. Each of the functional units of the schedule management server 12 is a function or means implemented by any one of the components illustrated in FIG. 3 under the instructions from the CPU 501 executing programs loaded on the RAM 503 from the HD 504. Further, the schedule management server 12 includes a storage unit 8000, implemented by the HD 504 illustrated in FIG. 3.

(User Authentication Management Table)

FIG. 12 is an example of schematic diagram of a user authentication management table. The storage unit 8000 includes a user authentication management DB 8001 configured by the user authentication management table illustrated in FIG. 12. The user authentication management table stores or manages organization ID identifying each organization to which each user belongs, and password in association with each other for user ID identifying each user.

(User Management Table)

FIG. 13 is an example of schematic diagram of a user management table. The storage unit 8000 includes a user management DB 8002 configured by the user management table illustrated in FIG. 13. The user management table stores or manages user ID, and name (user name) of each user indicated by user ID in association with each other for each organization ID.

(Union Management Table)

FIG. 14 is an example of schematic diagram of a resource management table. The storage unit 8000 includes a resource management DB 8003 configured by the resource management table illustrated in FIG. 14. In this resource management table, a resource ID for identifying a resource and a name of resource (resource name) are associated and managed for each organization ID.

(Resource Reservation Management Table)

FIG. 15 is an example of schematic diagram of a resource reservation management table. The storage unit 8000 includes a resource reservation management DB 8004 configured by the resource reservation management table illustrated in FIG. 15. The resource reservation management table stores or manages reservation information in a state, in which each piece of information is associated with each other. The reservation information includes, for example, resource ID, resource name, user ID of shared terminal, user ID of reservation holder, scheduled use start date/time, scheduled use end date/time, and event name for each organization ID.

The "user ID of shared terminal" is a user ID of the shared terminal 42 installed in a conference room that is an example of resource.

The scheduled use start date/time indicates, for example, a scheduled use start date/time of each resource. The scheduled use end date/time indicates, for example, a scheduled use end date/time of each resource. Each date indicates, for example, year, month, day, hour, minute, second, and time zone. Each date illustrated in FIG. 15 represents year, month, day, hour, and minute due to the limitation of space.

(Event Management Table)

FIG. 16 is an example of schematic diagram of an event management table. The storage unit 8000 includes an event management DB 8005 configured by the event management table illustrated in FIG. 16. The event management table stores or manages schedule information in a state, in which each piece of information is associated with each other. The schedule information includes organization ID, user ID, user name, scheduled event start date/time, scheduled event end date/time, and event name, memo, and file data in association with each other for each scheduled event ID.

The scheduled event start date/time indicates a scheduled start date/time when an event is to be conducted. The scheduled event end date/time indicates a scheduled end date/time when an event is to be conducted.

Each date/time indicates, for example, year, month, day, hour, minute, second, and time zone. Each/time date illustrated in FIG. 16 represents year, month, day, hour, and minute for the limitation of sheet. Further, as illustrated in FIG. 16, the event management table stores or manages file data of reference file, to be used in an event indicated in the schedule information, in association with the scheduled event ID.

(Server Authentication Management Table)

FIG. 17 is an example of schematic diagram of a server authentication management table. The storage unit 8000 includes a server authentication management DB 8006 configured by the server authentication management table illustrated in FIG. 17. The server authentication management table stores or manages access ID, and access password in association with each other. The access ID and access password have the same concept as the access ID and access password stored or managed by the access management DB 6002 of the sharing assistant server 11.

(Project Member Management Table)

FIG. 18 is an example of schematic diagram of a project member management table. The storage unit 8000 includes a project member management DB 8007 configured by the project member management table illustrated in FIG. 18. The project member management table stores or manages project ID, project name, and user ID of each project member in association with each other for each organization ID.

(Conducted Event Record Management Table)

FIG. 19 is an example of schematic diagram of a conducted event record management table. The storage unit 8000 includes a conducted event record management DB 8008 configured by the conducted event record management table illustrated in FIG. 19. The conducted event record management DB may be also referred to as the conducted event history management DB. The conducted event record management table stores or manages content processing ID, type of content processing (content processing type), material of content (content data), and start date/time and end date/time of content processing in association with each other for each project ID and conducted event ID.

The conducted event record management DB 8008 stores or manages data, which are partially the same as the content management DB 6005. The same data includes, for example, conducted event ID, content processing ID, type of content processing, start date/time of content processing, and end date/time of content processing. The material of content (content data) has the same storage destination only different in expression of storage destination of content data, such as http:// or c://.

(Conducted Event Management Table)

FIG. 20 is an example of schematic diagram of a conducted event management table. The storage unit 8000 includes a conducted event management DB 8009 configured by the conducted event management table illustrated in FIG. 20. The conducted event management table stores or manages event name, start date/time of event, and end date/time of event in association with each other for each conducted event ID. The conducted event management. DB 8009 stores or manages information related to each event that was actually conducted among the schedule information stored or managed in the event management DB 8005.

(Related Information Management Table)

FIG. 21 is an example of schematic diagram of a related information management table. The storage unit 8000 includes a related information management DB 8010 configured by the related information management table illustrated in FIG. 21. The related information management table stores or manages related information in a state, in which each piece of information or data is associated with each other for each project ID and conducted event ID. The related information is stored or managed by associating content generation time, recorded video data/recorded audio data, voice-text data, and screen data (image data) with each other.

The content generation time indicates a time of generation of content in a conducted event, which is elapsed from a start date/time of the conducted event. The content generation time is generated by the generation unit 83 based on the start date/time of event stored in the event management DB 8005 and the start date/time and end date/time of the content processing stored in the conducted event record management DB 8008. The content generation time is an example of time information.

The recorded video data/recorded audio data includes, for example, content processing ID and type of content processing.

The voice-text data and screen data include, for example, content processing ID, type of content processing, and sequence number (No.). The sequence No. indicates an occurrence time sequence in which the content processing has occurred on the voice-text data and the screen data, respectively.

(Functional Configuration of the Schedule Management Server)

Hereinafter, with reference to FIG. 6, a description is given of each functional unit of the schedule management server 12. In the following description, each functional unit of the schedule management server 12, among the components illustrated in FIG. 3, the relationship with the main components for implementing each functional unit of the schedule management server 12 is to be also described.

The transmission/reception unit 81 of the schedule management server 12 illustrated in FIG. 6 is implemented by the instructions from the CPU 501 illustrated in FIG. 3 and the network PF 509 illustrated in FIG. 3. The transmission/reception unit 81 transmits and receives various data or information to and from the user terminal 40, other server, other system, or the like via the communication network 50.

The authentication unit 82, which is implemented by the instructions from the CPU 501 illustrated in FIG. 3, performs authentication by determining whether information (e.g., user ID, organization ID, and password) transmitted from the user terminal 40 or shared terminal 42 matches information registered in the user authentication management DB 8001 in advance.

Further, the authentication unit 82 performs authentication by determining whether information (e.g., access ID and access password) transmitted from the sharing assistant server 11 matches information registered in the server authentication management DB 8006 in advance.

The generation unit 83, which is implemented by the instructions from the CPU 501 illustrated in FIG. 3, has a function of generating related information to be registered in the related information management DB 8010.

The management unit 84, which is implemented by the instructions from the CPU 501 illustrated in FIG. 3, manages an event (e.g., online meeting).

The storing/reading processing unit 89, which is implemented by the instructions from the CPU 501 illustrated in FIG. 3 and the HDD controller 505 illustrated in FIG. 3, performs processing for storing various data in the storage unit 8000 and reading various data stored in the storage unit 8000.

(Functional Configuration of Online Storage Server)

As illustrated in FIG. 6, the online storage server 20 includes, for example, a transmission/reception unit 91, and a storing/reading processing unit 99. Each of the functional units of the online storage server 20 is a function or means implemented by any one of the components illustrated in FIG. 3 under the instructions from the CPU 501 executing programs loaded on the RAM 503 from the HD 504. Further, the online storage server 20 illustrated in FIG. 6 includes a storage unit 9000, implemented by the HD 504 illustrated in FIG. 3.

(Functional Configuration of Online Storage Server)

Hereinafter, with reference to FIG. 6, a description is given of each functional unit of the online storage server 20.

In the following description, each functional unit of the online storage server 20, among the components illustrated in FIG. 3, the relationship with the main components for implementing each functional unit of the online storage server 20 is to be also described.

The transmission/reception unit 91 of the online storage server 20 illustrated in FIG. 6 is implemented by the instructions from the CPU 501 illustrated in FIG. 3 and the network I/F 509 illustrated in FIG. 3. The transmission/reception unit 91 transmits and receives various data or information to and from the user terminal 40, the shared terminal 42, other server, other system, or the like via the communication network 50.

The storing/reading processing unit 99, which is implemented by the instructions from the CPU 501 illustrated in FIG. 3 and the HDD controller 505 illustrated in FIG. 3, performs processing for storing various data in the storage unit 9000 and reading various data stored in the storage unit 9000. In this description, some devices and controllers can be configured using one or more circuits.

Each of the above described IDs is an example of identification information. The organization ID includes, for example, company name, business office name, department name, region name, or the like. The user ID includes, for example, employee number, driver's license number, and a social number in the Japanese social security and tax number system.

The functional configuration illustrated in FIG. 6 is just one example, and the functions (processing units and storage units) of the sharing assistant server 11, the schedule management server 12, the online storage server 20, the user terminal 40, and the shared terminal 42 may be performed in any of the sharing assistant server 11, the schedule management server 12, the online storage server 20, the user terminal 40, and the shared terminal 42. For example, the determination unit 65 of the sharing assistant server 11 may be included in either the user terminal 40 or the shared terminal 42.

(Processing/Operation)

Hereinafter, with reference to FIGS. 22 to 29, a description is given of processing/operation of each embodiment.

(Schedule Registration Processing)

Hereinafter, a description is given of a process that the reservation holder A (e.g., name is Taro Riko) registers his/her schedule from the user terminal 40 to the schedule management server 12. The reservation holder is a reservation person.

Figure 22:
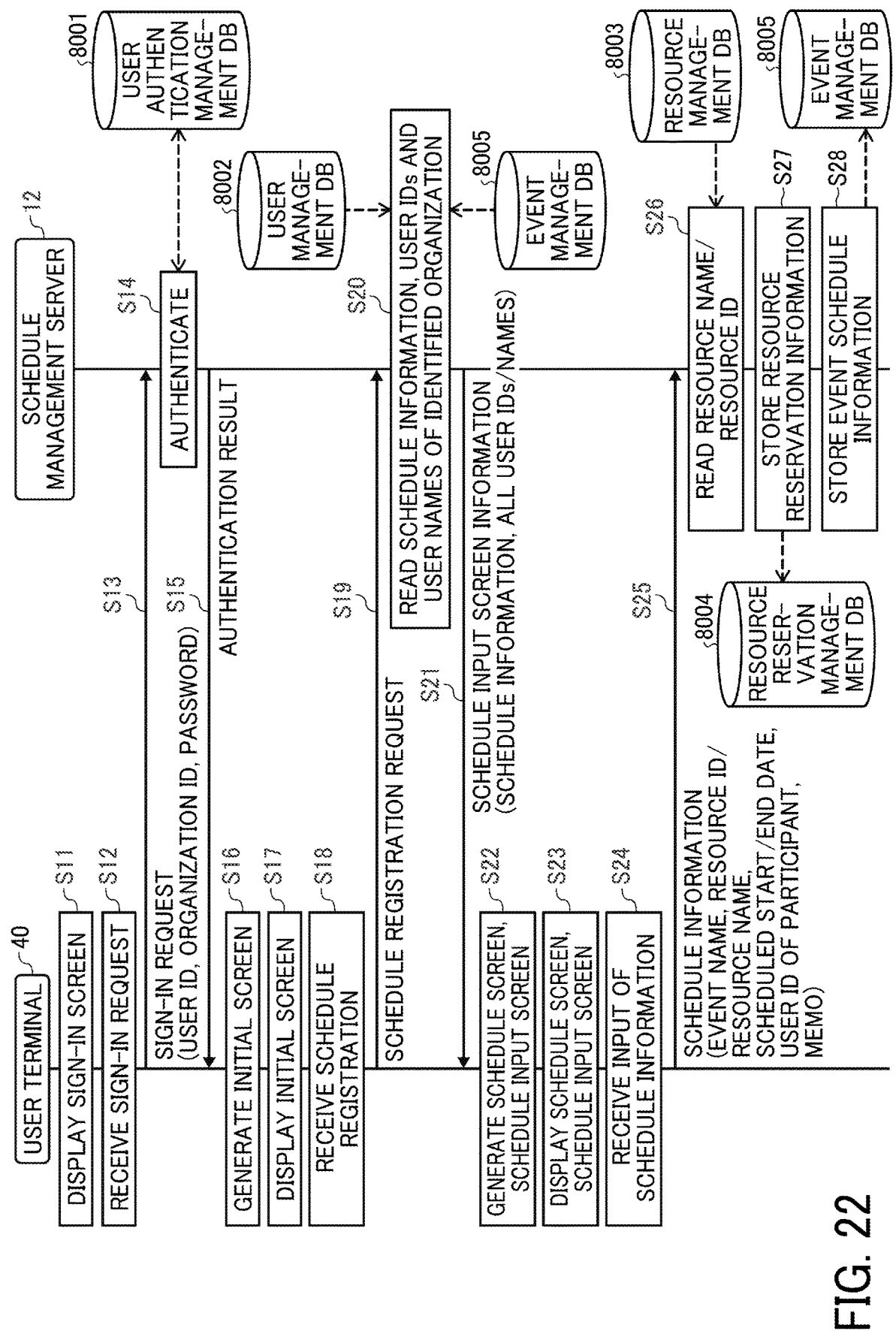
FIG. 22 is an example sequence diagram illustrating a process of registering a schedule.
Figure 23:
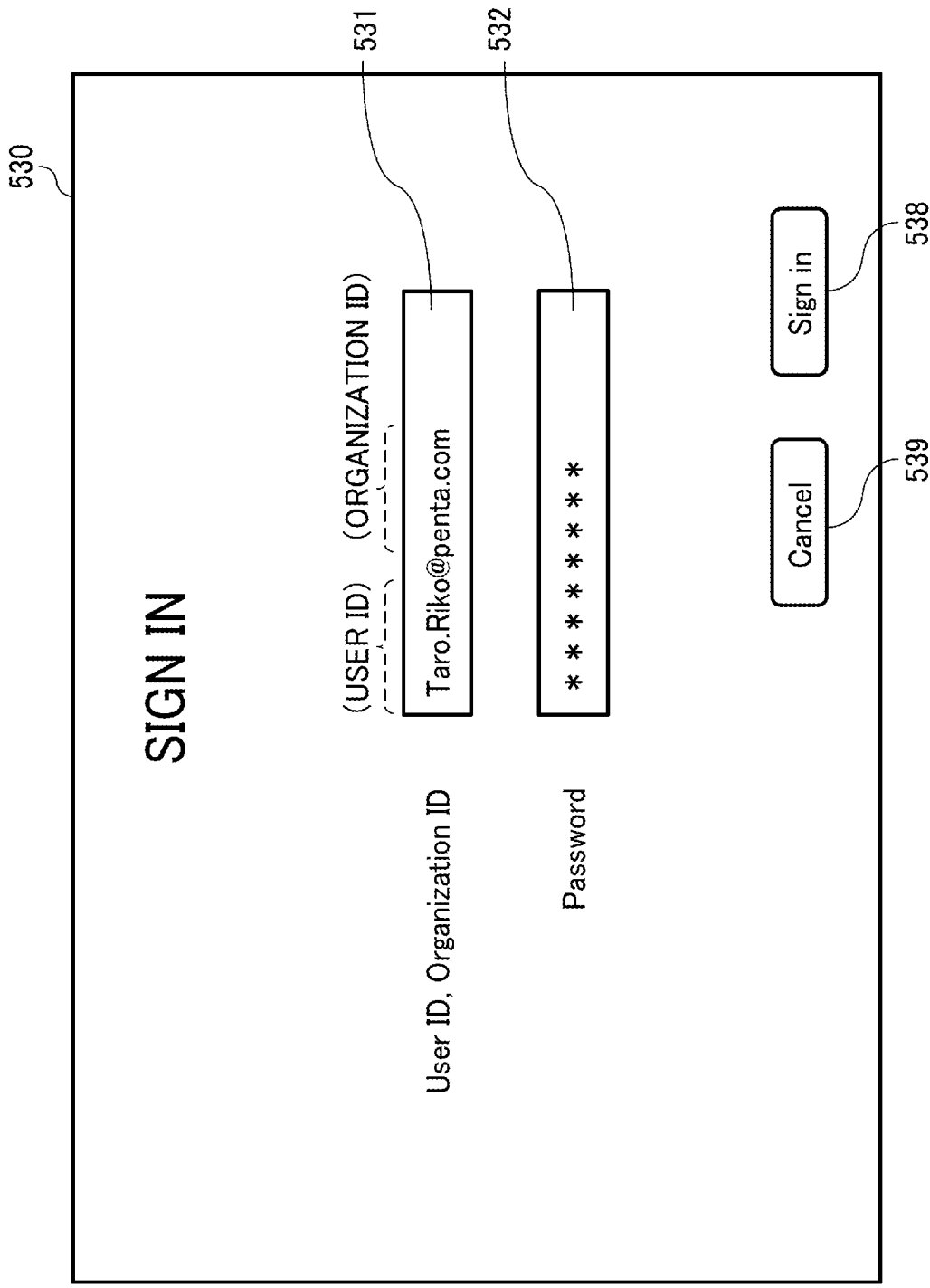
FIG. 23 is an example of sign-in screen.
Figure 24:
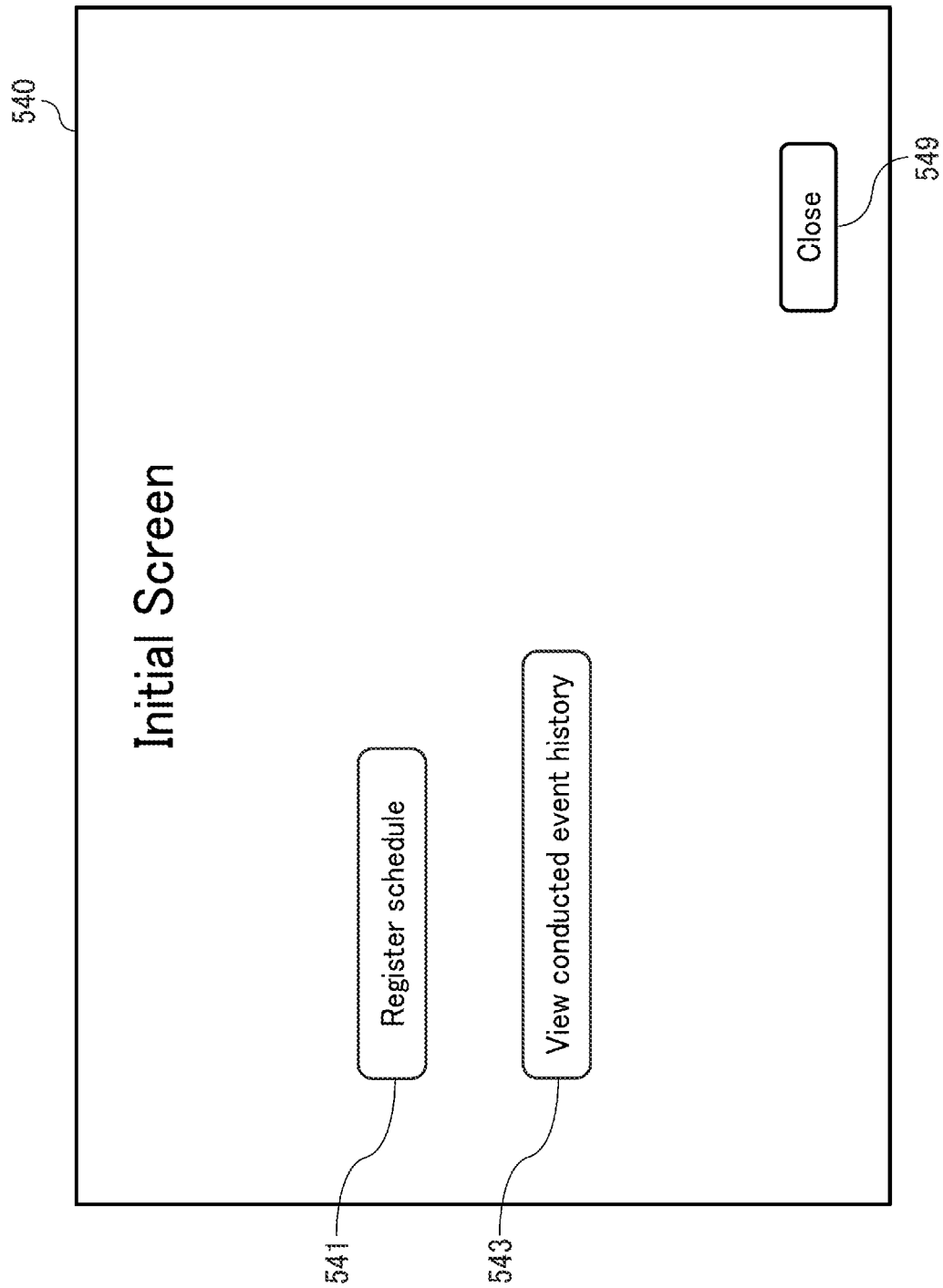
FIG. 24 is an example of initial screen of a user terminal.
Figure 26:
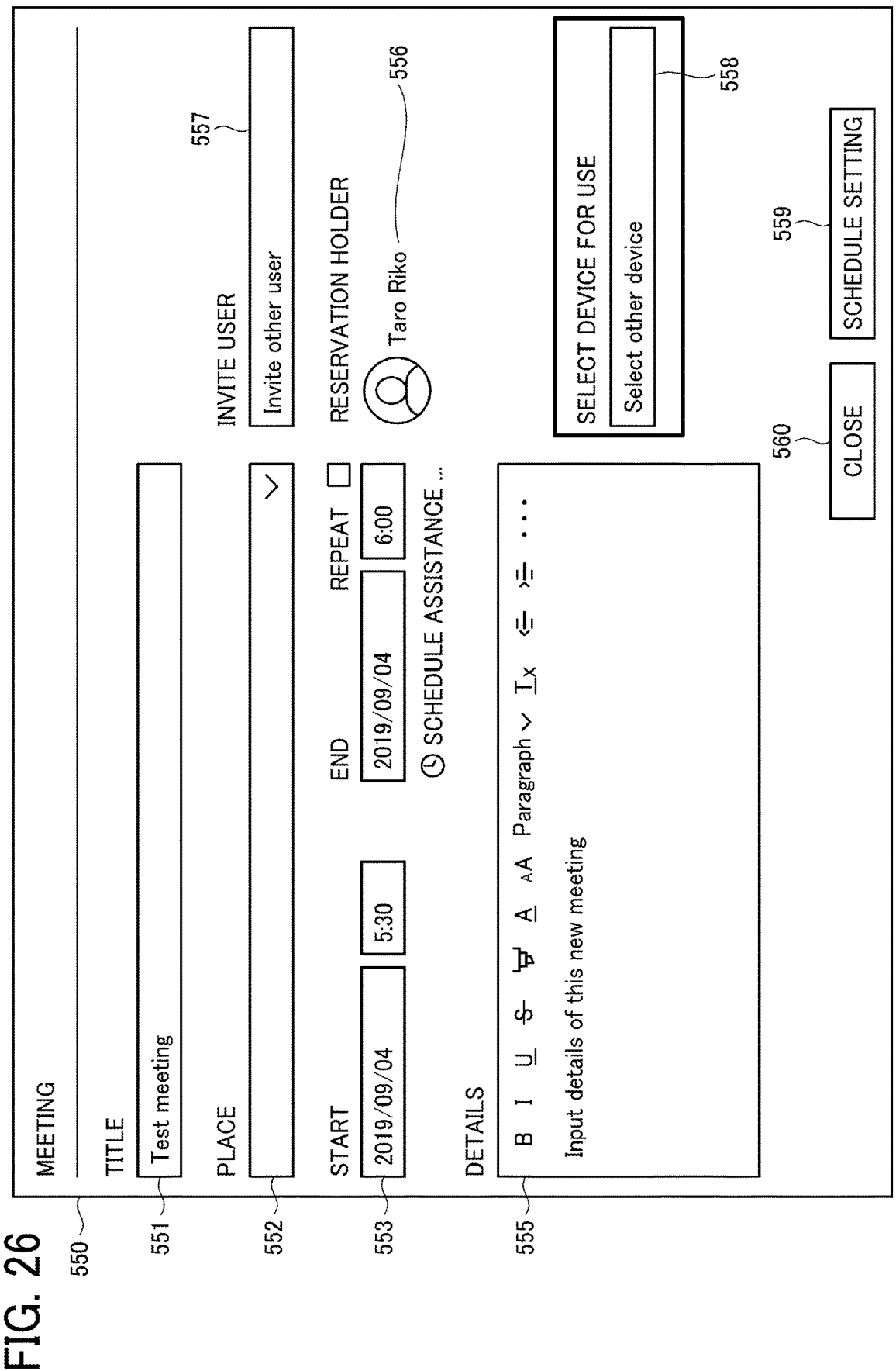
FIG. 26 is an example of schedule input screen.

FIG. 22 is an example sequence diagram of a process of registering a schedule (schedule registration process). FIG. 23 is an example of sign-in screen. FIG. 24 is an example of initial screen of the user terminal 40. FIG. 25 is an example of schedule screen. FIG. 26 is an example of schedule input screen.

At first, when the reservation holder A operates the keyboard 511 of the user terminal 40, the display control unit 54 of the user terminal 40 displays a sign-in screen 530 used for performing the sign-in on the display 506 as illustrated in FIG. 23 (step S11).

The sign-in screen 530 includes, for example, an input field 531, an input field 532, a sign-in button 538, and a cancel button 539.

The input field 531 is used for inputting a user ID and an organization ID of a user. The input field 532 is used for inputting a password.

The sign-in button 538 is to be pressed in a case of performing the sign-in. The cancel button 539 is to be pressed in a case of canceling the sign-in.

In this example case, the user ID and the organization ID configure an e-mail address of the reservation holder A. The user name portion of the e-mail address indicates the user ID, and the domain name portion indicates the organization ID. Further, the input field 531 may be an input field used for separately inputting the user ID and the organization ID instead of the e-mail address.

Then, if the reservation holder A inputs his/her user ID and organization ID in the input field 531, inputs his/her password in the input field 532, and then presses the sign-in button 538, the reception unit 52 receives or accepts a sign-in request (step S12).

Then, the transmission/reception unit 51 of the user terminal 40 transmits sign-in request information indicating the sign-in request to the schedule management server 12 (step S13). The sign-in request information includes information received in step S12 such as user ID, organization ID, and password. Then, the transmission/reception unit 81 of the schedule management server 12 receives the sign-in request information.

Then, the authentication unit 82 of the schedule management server 12 authenticates the reservation holder A using the user ID, organization ID, and password (step S14). Specifically, the storing/reading processing unit 89 searches a combination of user ID, organization ID, and password corresponding to a combination of the user ID, organization ID, and password received in step S13, in the user authentication management DB 8001 (see FIG. 12).

If the corresponding combination exists in the user authentication management DB 8001, the authentication unit 82 determines that the reservation holder A of request source is an authenticated user.

On the other hand, if the corresponding combination does not exist in the user authentication management DB 8001, the authentication unit 82 determines that the reservation holder A is not an authenticated user (i.e., the reservation holder A is an unauthenticated user). If the reservation holder A is the unauthenticated user, the transmission/reception unit 81 notifies the user terminal 40 that the reservation holder A is the unauthenticated user. In this example case, the description is given by assuming the reservation holder A is the authenticated user.

Then, the transmission/reception unit 81 transmits an authentication result to the user terminal 40 (step S15). Then, the transmission/reception unit 51 of the user terminal 40 receives the authentication result.

Then, in response to receiving the authentication result indicating that the authentication result is valid in step S15, the generation unit 56 of the user terminal 40 generates an initial screen 540 illustrated in FIG. 24 (step S16).

Then, the display control unit 54 of the user terminal 40 instructs the display 506 to display the initial screen 540 as illustrated in FIG. 24 (step S17).

As illustrated in FIG. 24, the initial screen 540 includes, for example, a "register schedule" button 541 to be pressed when a schedule is registered, and a "view conducted event record" button 543 to be pressed when a conducted event record is to be viewed.

If the user presses the "register schedule" button 541, the reception unit 52 receives the schedule registration request (step S18).

Then, the transmission/reception unit 51 transmits the schedule registration request information to the schedule management server 12 (step S19). Then, the transmission/reception unit 81 of the schedule management server 12 receives the schedule registration request information.

Then, the storing/reading processing unit 89 of the schedule management server 12 searches the event management DB 8005 (see FIG. 16) managed by the scheduler using the user ID of the reservation holder A received in step S13 as a search key to read out the corresponding schedule information (step S20). Further, the storing/reading processing unit 89 of the schedule management server 12 searches the user management DB 8002 (see FIG. 13) using the organization ID received in step S13 as a search key to read out all of corresponding user IDs and all of corresponding user names (step S20).

Then, the transmission/reception unit 81 transmits schedule input screen information to the user terminal 40 (step S21). Then, the transmission/reception unit 51 of the user terminal 40 receives the schedule input screen information.

The schedule input screen information includes, for example, schedule information of the reservation holder A, all user IDs, and all user names read out in step S20. All of user names also include a title (name) of the reservation holder, such as the reservation holder A, who has input information for the sign-in in step S12.

Then, at the user terminal 40, the generation unit 56 generates a schedule screen 545 (see FIG. 25) and a schedule input screen 550 (see FIG. 26) using the schedule input screen information received in step S21 (step S22).

Then, the display control unit 54 of the user terminal 40 instructs the display 506 to display the schedule screen 545 and the schedule input screen 550 (step S23).

As illustrated in FIG. 25, the schedule screen 545 includes a schedule information display field 546 used for displaying schedule information set for the reservation holder A, and a "create meeting" button 547 to be pressed when creating a meeting schedule. The reservation holder A can shift from the schedule screen 545 (see FIG. 25) to the schedule input screen 550 (see FIG. 26) by pressing the "create meeting" button 547 on the schedule screen 545.

As illustrated in FIG. 26, the schedule input screen 550 includes, for example, an input field 551, an input field 552, an input field 553, an input field 554, an input field 555, a display area 556, an input field 557, an input field 558, a "schedule setting" button 559, and a "close" button 560.

The input field 551 is used for inputting an event name. The input field 552 is used for inputting a resource ID or a resource name to be used as a place (e.g., conference room). The input field 553 is used for inputting a scheduled start date/time of execution of event, and a scheduled end date/time of execution of event. The input field 555 is used for inputting a memo such as agenda or the like.

The display area 556 is used for displaying a reservation holder name.

The input field 557 is used for selecting one or more participant names of participants other than the reservation holder. The input field 558 is used for inputting the shared terminal 42 to be used in an event.

The "schedule setting" button 559 is to be pressed in a case of registering a reservation. The "close" button 560 is to be pressed in a case of canceling information being input or input information.

Figure 27:
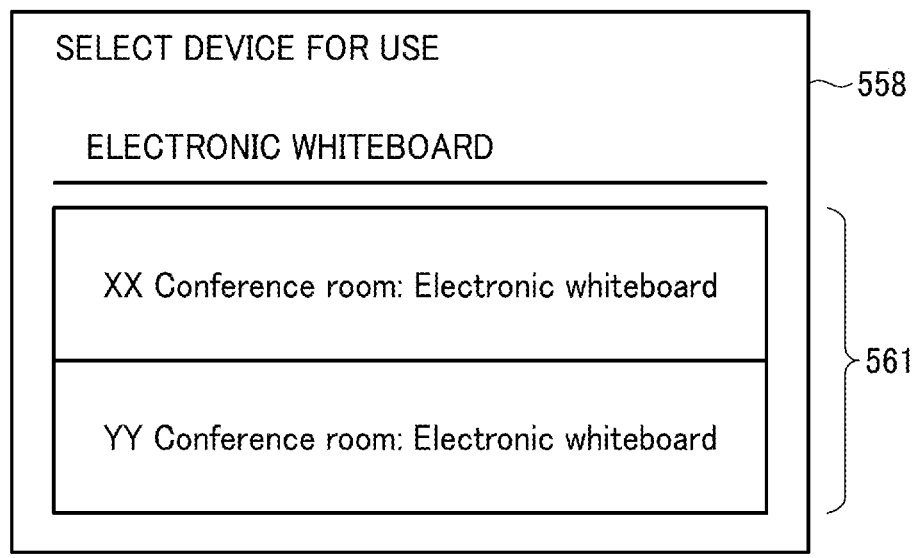
FIG. 27 is an example of a diagram indication candidates proposed on a schedule input screen.
Figure 28:
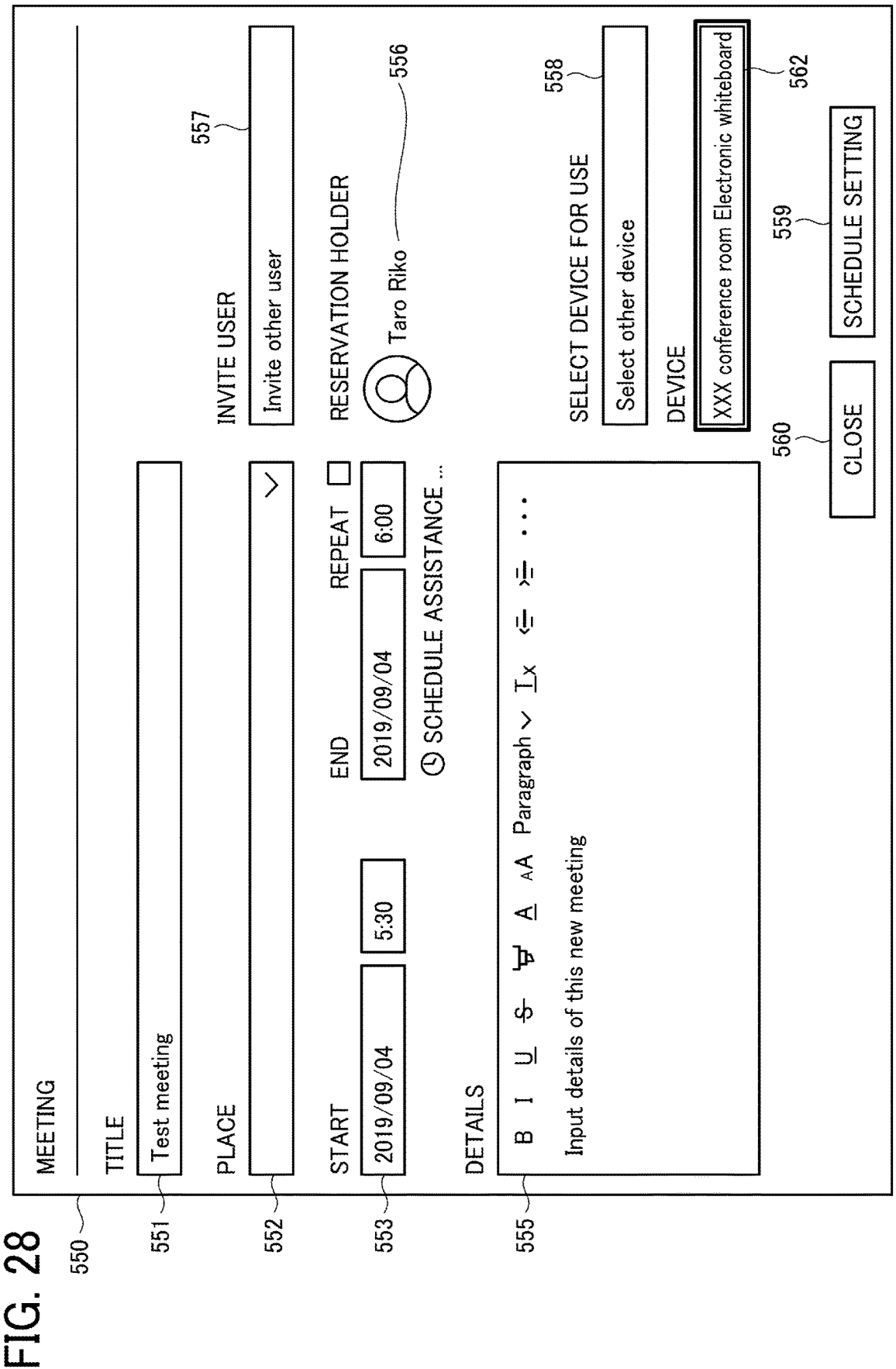
FIG. 28 is an example of schedule input screen.

Further, the input field 558 used for inputting the shared terminal 42 to be used in the event can be configured to present or propose a candidate 561 as illustrated in FIG. 27, for example, by inputting a part of name (user name) of the shared terminal 42. When a user inputs the information in the input field 558 or selects the shared terminal 42 to be used in the event from the candidate 561, the shared terminal 42 is set as a device to be used for the event in a device display field 562 of the schedule input screen 550 as indicated in FIG. 28.

Figure 29:
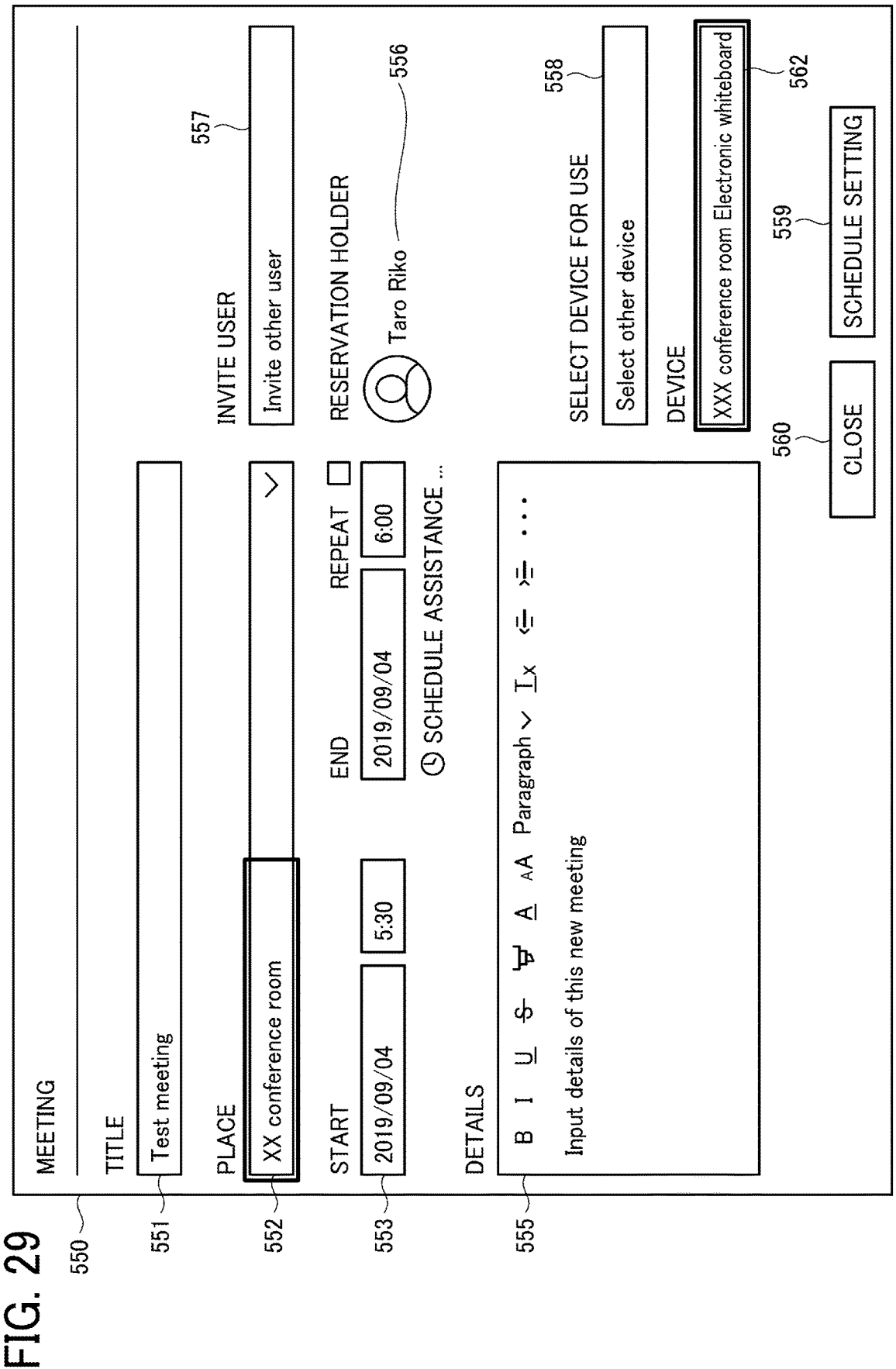
FIG. 29 is an example of schedule input screen.

Further, as to the setting of the device to be used in the event, for example, as illustrated in the schedule input screen 550 illustrated in FIG. 29, by inputting a place to be used, such as a conference room, into the input field 552, the shared terminal 42 installed in the place to be used, such as the conference room, may be set as the device to be used in the event.

Then, the reservation holder A inputs necessary information on the schedule input screen 550, and then presses the "schedule setting" button 559.

Then, the reception unit 52 receives an input of the schedule information (step S24).

Then, the transmission/reception unit 51 transmits the schedule information to the schedule management server 12 (step S25).

The schedule information includes, for example, event name, resource ID (or resource name), scheduled start date/time, scheduled end date/time, user ID of each participant, user ID of to-be-used shared terminal 42, and a memo. Although not illustrated in the schedule input screen 550 of FIG. 25, if a selection of file data of reference material to be used in an event is received from the reservation holder A, the file data is included in the schedule information.

Then, the transmission/reception unit 81 of the schedule management server 12 receives the schedule information.

Then, if the schedule management server 12 receives the resource ID (or resource name) in step S25, the schedule management server 12 searches the resource management DB 8003 (see FIG. 14) using the received resource ID as a search key to read out the corresponding resource name (or resource ID) (step S26).

Then, the storing/reading processing unit 89 stores the reservation information for the resource name (or resource ID) read out in step S26 in the resource reservation management DB 8004 (see FIG. 15) (step S27). The storing/reading processing unit 89 adds one record of the reservation information to the resource reservation management table stored in the resource reservation management DB 8004 managed by the scheduler registered in advance. The reservation information is configured based on the schedule information received in step S25 and the resource name (or resource ID) read out in step S26.

In an example of the resource reservation management table illustrated in FIG. 15, the item of "user ID of shared terminal" represents the shared terminal 42 set as a device to be used in an event.

Further, the scheduled use start date/time stored in the resource reservation management DB 8004 corresponds to the scheduled start date/time included in the schedule information. Further, the scheduled use end date/time stored in the resource reservation management DB 8004 corresponds to the scheduled end date/time included in the schedule information.

Further, the storing/reading processing unit 89 stores the schedule information (event information) in the event management DB 8005 (see FIG. 16) (step S28). The storing/reading processing unit 89 adds one record of the schedule information to the event management table stored in the event management DB 8005 managed by the scheduler registered in advance.

The schedule information is configured based on the schedule information received in step S25. As to an example of the event management table illustrated in FIG. 16, the shared terminal 42 having the user ID "u0000" is set as a device to be used in an event.

Further, the scheduled event start date/time in the event management DB 8005 corresponds to the scheduled start date/time in the schedule information. Further, the scheduled event end date/time in the event management DB 8005 corresponds to the scheduled end date/time included in the schedule information.

With this configuration, the reservation holder A can register a schedule of an event, such as an online meeting, in which the shared terminal 42 is selected as a device to be used.

(Event Start Processing)

Figure 30:
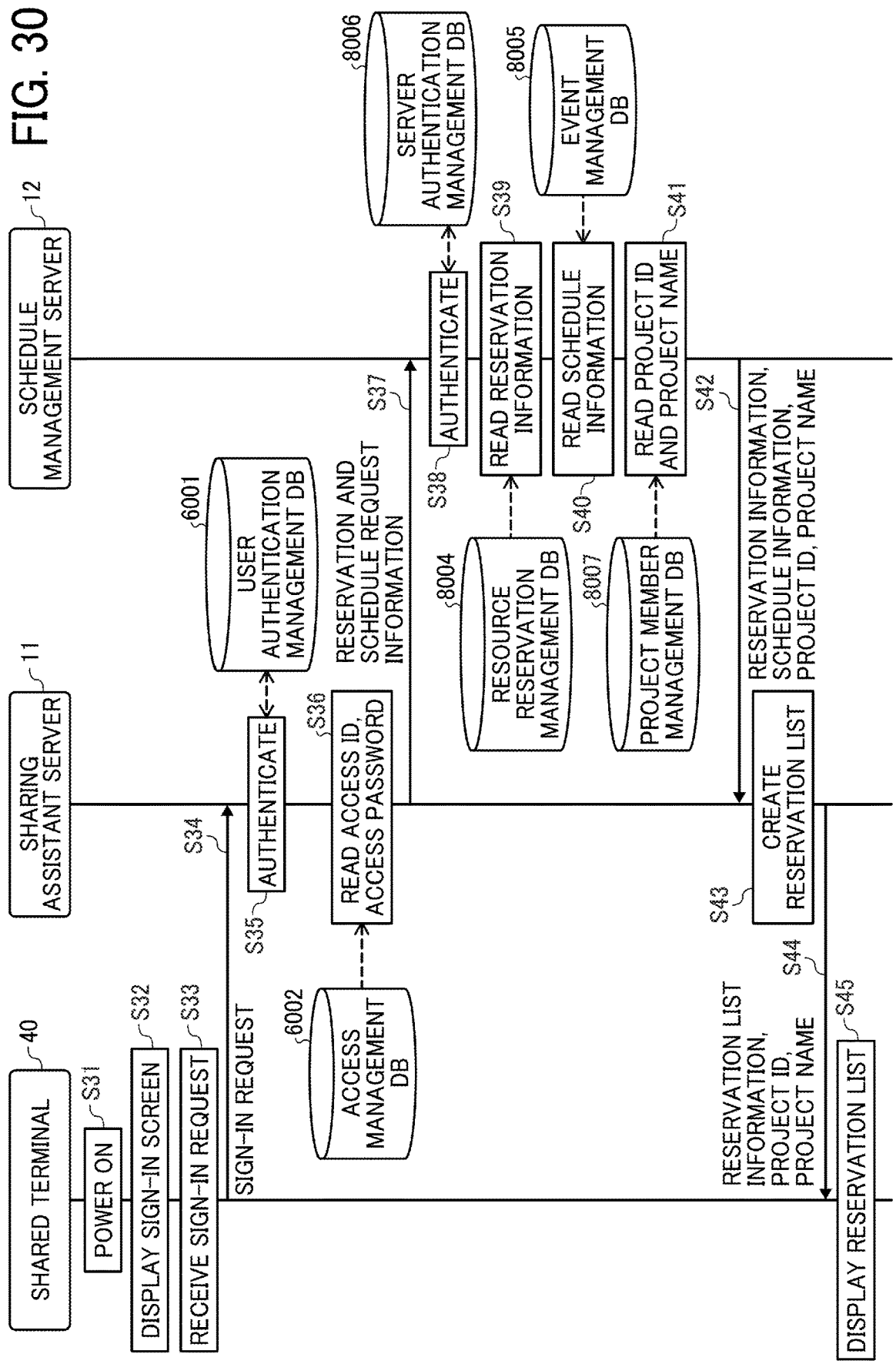
FIGS. 30 and 31 are examples of sequence diagrams indicating a process of starting an event.
Figure 31:
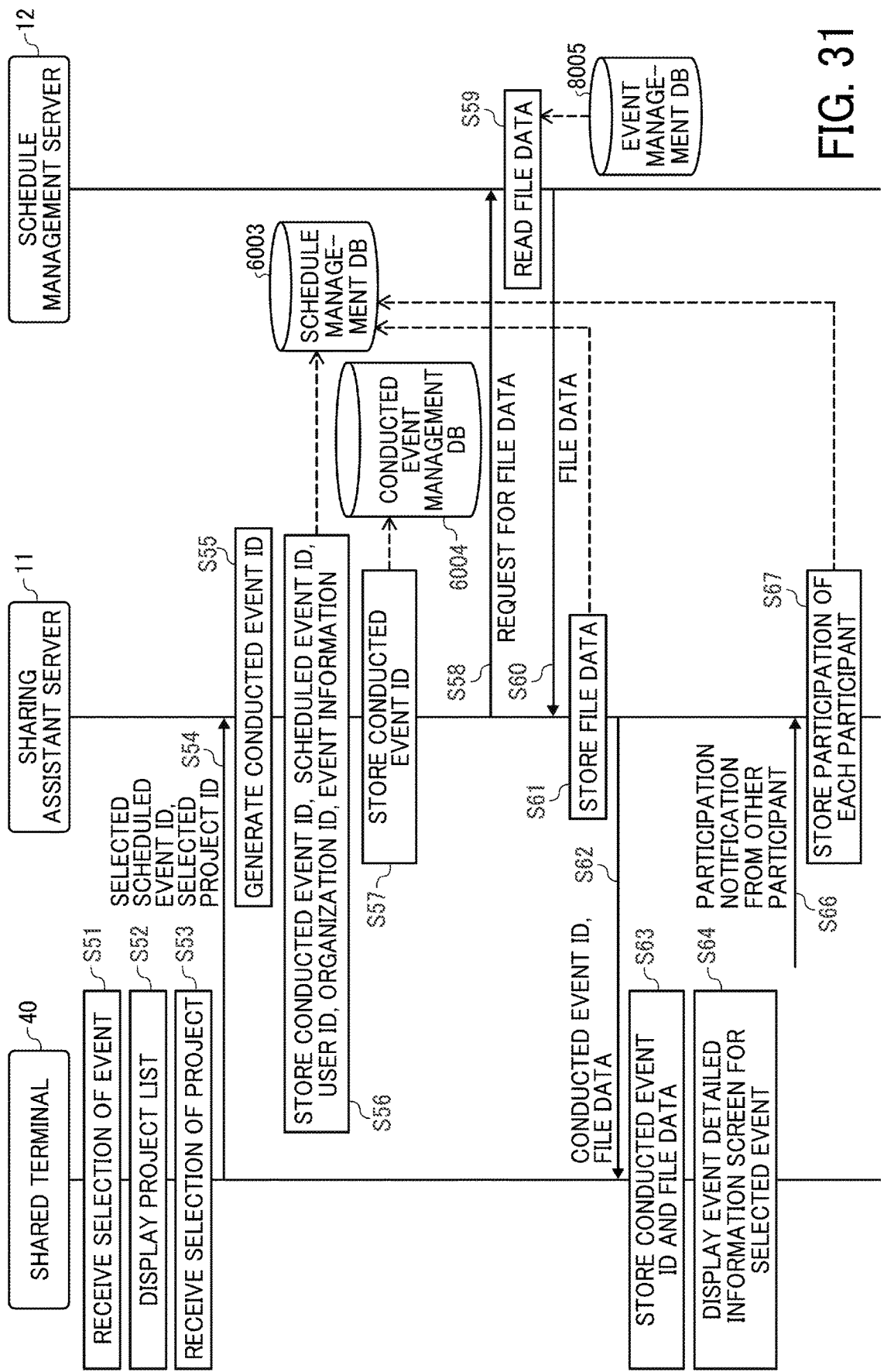

Hereinafter, with reference to FIGS. 30 and 31, a description is given of a process of holding a meeting with the user terminal 40 of other participant by using the shared terminal 42 in the conference room X reserved by the reservation holder A (e.g., name is Taro Riko). FIGS. 30 and 31 are examples of sequence diagrams indicating a process of starting an event.

At first, when the reservation holder A presses a power switch of the shared terminal 42, the reception unit 22 of the shared terminal 42 receives a power ON signal from the reservation holder A (step S31).

Then, the display control unit 24 of the shared terminal 42 displays a sign-in screen used for performing a sign-in on the display 220 (step S32).

Then, if the reservation holder A inputs his/her e-mail address and password on the sign-in screen, the reception unit 22 receives or accepts a sign-in request (step S33).

Then, the transmission/reception unit 21 transmits sign-in request information indicating the sign-in request to the sharing assistant server 11 (step S34). The sign-in request information includes, for example, the information received in step S33 such as user ID, organization ID, and password. Then, the transmission/reception unit 61 of the sharing assistant server 11 receives the sign-in request information.

Then, the authentication unit 62 of the sharing assistant server 11 authenticates the reservation holder A using the user ID, organization ID, and password of the reservation holder A received in step S34 (step S35). Specifically, the storing/reading processing unit 69 uses the user ID, organization ID, and password of the reservation holder A received in step S34 as search keys to search a combination of user ID, organization ID, and password corresponding to a combination of the user ID, organization ID, and password of the reservation holder A received in step S34, in the user authentication management DB 6001 (see FIG. 7).

If the corresponding combination exists in the user authentication management DB 6001, the authentication unit 62 determines that the reservation holder A of request source is an authenticated user.

On the other hand, if the corresponding combination does not exist in the user authentication management DB 6001, the authentication unit 62 determines that the reservation holder A is not an authenticated user (i.e., the reservation holder A is an unauthenticated user). If the reservation holder A is the unauthenticated user, the transmission/reception unit 61 notifies the shared terminal 42 that the reservation holder A is the unauthenticated user.

In this example case, the description is given by assuming the reservation holder A is the authenticated user.

Then, the storing/reading processing unit 69 of the sharing assistant server 11 searches the access management DB 6002 (see FIG. 8) using the organization ID of the reservation holder A received in step S34 as a search key to read out the corresponding access ID and access password (step S36).

Then, the transmission/reception unit 61 transmits, to the schedule management server 12, reservation request information indicating a request for reservation information of resource, and schedule request information indicating a request for schedule information of user (step S37). The reservation request information and the schedule request information include the user ID, organization ID, and password of the reservation holder A received in step S34, and the access ID and access password read out in step S36. Then, the transmission/reception unit 81 of the schedule management server 12 receives the reservation request information and the schedule request information.

Then, the authentication unit 82 of the schedule management server 12 authenticates the sharing assistant server 11 using the access ID and access password (step S38).

Specifically, the storing/reading processing unit 89 searches a combination of access ID and access password corresponding to a combination of the access ID and access password received in step S37, in the server authentication management DB 8006 (see FIG. 17).

If the corresponding combination exists in the server authentication management DB 8006, the authentication unit 82 determines that the sharing assistant server 11 of request source is an authenticated access user.

On the other hand, if the corresponding combination does not exist in the server authentication management DB 8006, the authentication unit 82 determines that the sharing assistant server 11 of request source is not an authenticated access user (i.e., the sharing assistant server 11 is unauthenticated access user). If the sharing assistant server 11 is the unauthenticated access user, the transmission/reception unit 81 notifies the sharing assistant server 11 that the sharing assistant server 11 is the unauthenticated access user.

In this example case, the description is given by assuming the sharing assistant server 11 is the authenticated access user.

Then, the storing/reading processing unit 89 of the schedule management server 12 reads out the corresponding reservation information by searching the resource reservation management DB 8004 (see FIG. 15) managed by the scheduler using the resource ID received in step S37 as a search key (step S39). In step S39, the storing/reading processing unit 89 reads out the reservation information whose scheduled use start date/time is today.

Further, the storing/reading processing unit 89 searches the event management DB 8005 (see FIG. 16) managed by the scheduler using the user ID of the reservation holder A received in step S37 as a search key to read out the corresponding schedule information (step S40).

In this example case, the storing/reading processing unit 89 reads out the schedule information whose event start schedule date is today. If the schedule management server 12 is located in a different country or region from the shared terminal 42, the schedule management server 12 adjusts the time zone in accordance with the country or region where the shared terminal 42 is located based on the time zone information.

Then, the storing/reading processing unit 89 searches the project member management DB 8007 (see FIG. 18) using the user ID of the reservation holder A received in step S37 as a search key to read out the project ID and the project name of all of projects including the user ID of the reservation holder A (step S41).

Then, the transmission/reception unit 81 transmits, to the sharing assistant server 11, the reservation information read out in step S39, the schedule information read out in step S40, and all of project IDs and all of project names read out in step S41 (step S42). Then, the transmission/reception unit 61 of the sharing assistant server 11 receives the reservation information, the schedule information, all of project IDs, and all of project names.

Then, the creation unit 63 of the sharing assistant server 11 creates a reservation list based on the reservation information and the schedule information received in step S42 (step S43).

Then, the transmission/reception unit 61 transmits, to the shared terminal 42, reservation list information indicating content of the reservation list, and all of project IDs and all of project names (step S44). Then, the transmission/reception unit 21 of the shared terminal 42 receives the reservation list information, and all of project IDs and all of project names.

Figure 32:
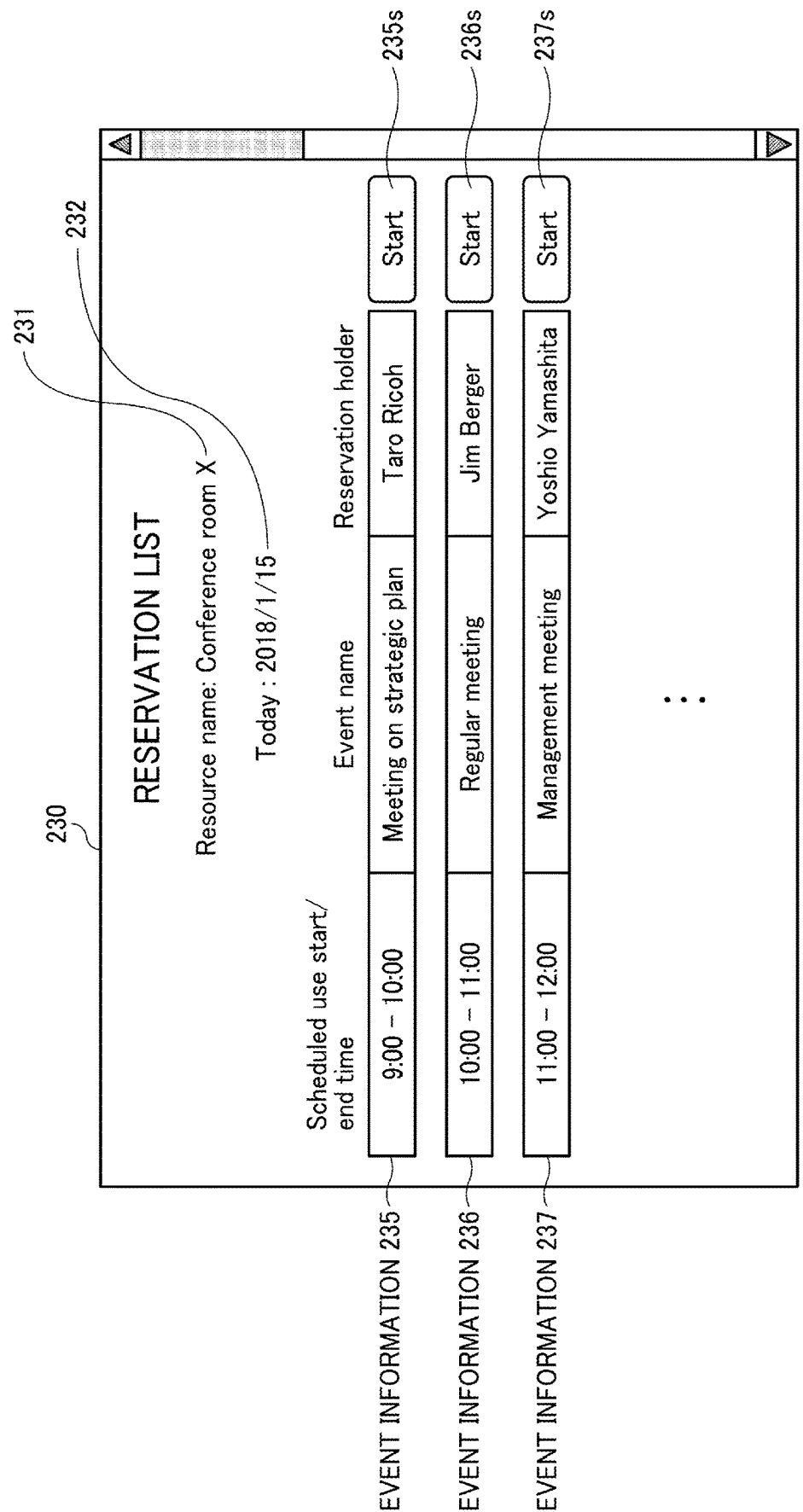
FIG. 32 is an example of resource reservation list screen.

Then, at the shared terminal 42, the display control unit 24 instructs the display 220 to display a reservation list screen 230 illustrated in FIG. 32 (step S45).

FIG. 32 is an example of a reservation list screen of the resource. The reservation list screen 230 includes a display area 231 used for displaying a resource name (in this case, place name), and a display area 232 used for displaying date of today. Further, the reservation list screen 230 displays event information 235 to 237 indicating each event using a particular resource (e.g., conference room X in this example) of the date of today.

The event information is information or data related to the above-described event. The event information includes, for example, scheduled use start time and end time of resource, event name, and name of person who has reserved each resource (reservation holder name) for each event. The event information includes, for example, start buttons 235s to 237s, or the like, to be pressed if a user designates or specifies an event to be started, but is not limited to thereto. The event information may include participant, actual use start and end time, communication conditions, calling quality, or the like.

Then, in FIG. 32, if the reservation holder A presses the start button 235s with the pointing device 512, the reception unit 52 receives a selection of an event indicated by the event information 235 (step S51).

Figure 33:
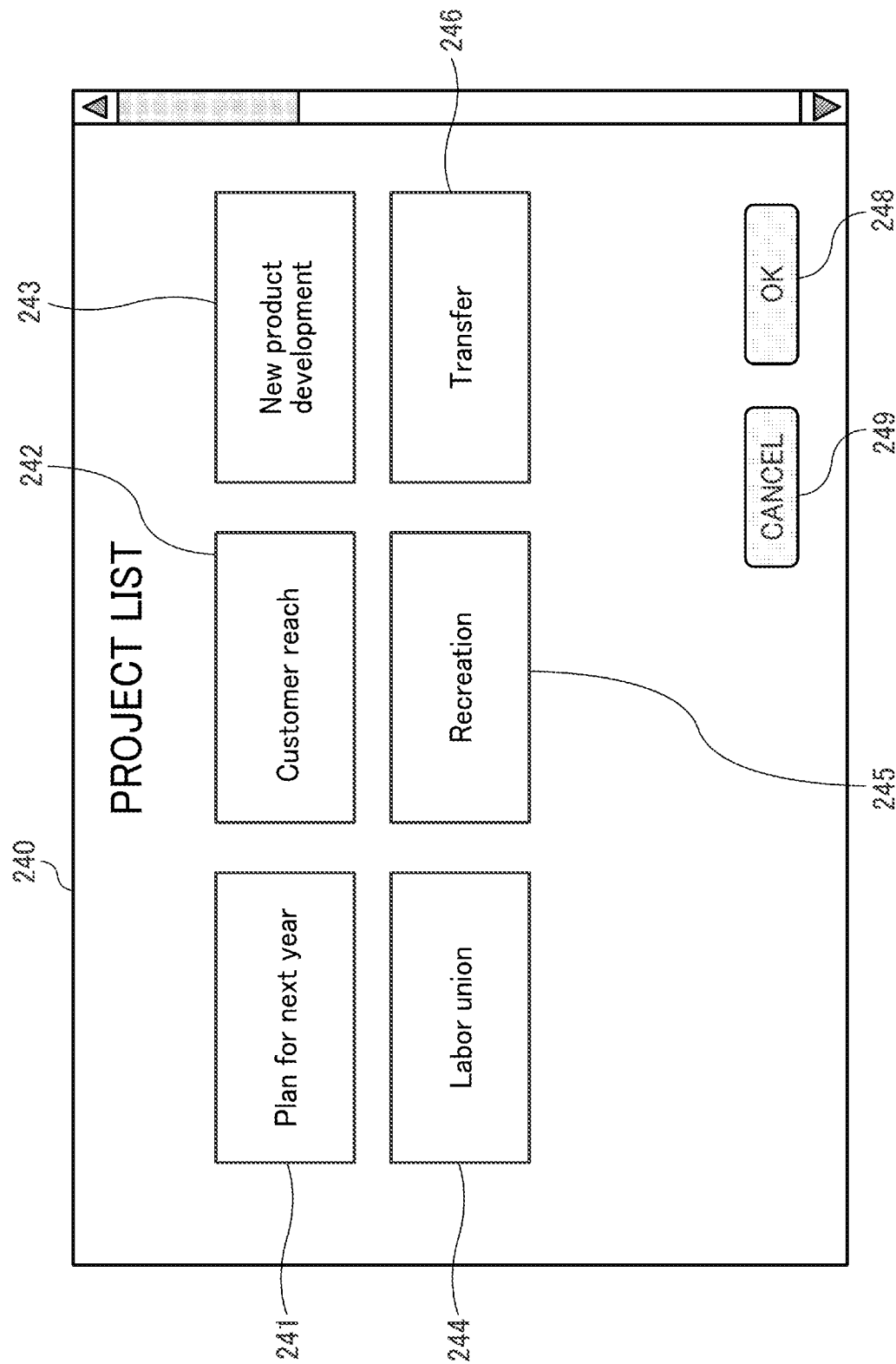
FIG. 33 is an example of project list screen.

Then, the display control unit 24 displays a project list screen 240, illustrated in FIG. 33, on the display 220 based on the project ID and the project name received in step S44 (step S52).

FIG. 33 is an example of the project list screen 240. The project list screen 240 includes, for example, project icons 241 to 246 indicating each project. The project list screen 240 further includes an "OK" button 248 to be pressed when to confirm a selected project icon, and a "CANCEL" button 249 to be pressed when to cancel a selection of project icon.

Then, in FIG. 33, if the reservation holder A presses the project icon 241 with the electronic pen 2500 or the like, the reception unit 22 receives a selection of a project indicated by the project icon 241 (step S53).

Then, the transmission/reception unit 21 of the shared terminal 42 transmits to the sharing assistant server 11, the scheduled event ID indicating the scheduled event selected in step S51, and the project ID indicating the project selected in step S53 (step S54). The processing of step S54 is a transmission request processing of conducted event identification information. Then, the transmission/reception unit 61 of the sharing assistant server 11 receives the selected scheduled event ID and the selected project ID.

Then, at the sharing assistant server 11, the generation unit 64 generates a unique conducted event ID (step S55).

Then, the storing/reading processing unit 69 stores or manages the conducted event ID generated in step S55, the scheduled event ID, user ID and organization ID of reservation holder, and the event information received in step S54 in association with each other (step S56).

The user ID and organization ID of the reservation holder and the event information are IDs and information based on the reservation information and the schedule information received in step S42. At this stage, information is not yet input in a column of participation or absence of the reservation management table (see FIG. 9).

Then, the storing/reading processing unit 69 stores or manages the project ID received in step S54, and the conducted event ID generated in step S55 in association with each other (step S57).

Then, at the sharing assistant server 11, the transmission/reception unit 61 transmits, to the schedule management server 12, file data transmission request information indicating a transmission request of file data registered in the schedule management server 12 (step S58). The file data transmission request information includes the scheduled event ID received in step S54, the user ID and organization ID of the reservation holder A received in step S34, and the access ID and access password read out in step S36. Then, the transmission/reception unit 81 of the schedule management server 12 receives the file data transmission request information.

Then, the storing/reading processing unit 89 of the schedule management server 12 searches the event management DB 8005 (see FIG. 16) using the scheduled event ID received in step S58 as a search key to read out file data associated with the scheduled event ID (step S59).

Then, the transmission/reception unit 81 transmits the file data read out in step S59 to the sharing assistant server 11 (step S60). Then, the transmission/reception unit 61 of the sharing assistant server 11 receives the file data.

Then, the storing/reading processing unit 69 of the sharing assistant server 11 stores and manages the file data received in step S60 in the schedule management DB 6003 (see FIG. 9) in association with the scheduled event ID received in step S54 and the conducted event ID generated in step S55 (step S61).

Then, the transmission/reception unit 61 transmits the conducted event ID generated in step S55 and the file data received in step S60 to the shared terminal 42 to which the reservation holder A has performed the sign-in (step S62). Then, the transmission/reception unit 21 of the shared terminal 42 receives the conducted event ID and the file data.

Further, the transmission/reception unit 21 may transmit an invitation to the event to the user terminal 40 of other participant using an invitation mail or the like. The attendance request for event includes, for example, various kinds of information for participating (attending) the event started by the reservation holder A.

With this configuration, the other participant can use the participation request notice for the particular event to notify his/her participation to the particular event from the user terminal 40 used by the other participant to the sharing assistant server 11 to participate the particular event, such as the online meeting started by the reservation holder A.

Then, at the shared terminal 42, the storing/reading processing unit 29 stores the conducted event ID and the file data in the storage unit 2000 (step S63). In step S63, the file data transmitted from the sharing assistant server 11 is stored in a specific storage area of the storage unit 2000. With this configuration, the shared terminal 42 accesses the specific storage area during the execution of the event, and the display control unit 24 instructs the display 220 to display the file data stored in the specific storage area.

The specific storage area is a temporary storage destination of data provided for each event that is being conducted, and is a storage area specified by an arbitrary path (text string) indicating a location in the storage unit 2000.

Further, the specific storage area is not limited to the configuration provided inside the shared terminal 42. For example, the specific storage area may be provided in an external storage device connected to the shared terminal 42 or in a local server which exists in an on-premise environment and can communicate with the shared terminal 42.

Figure 34:
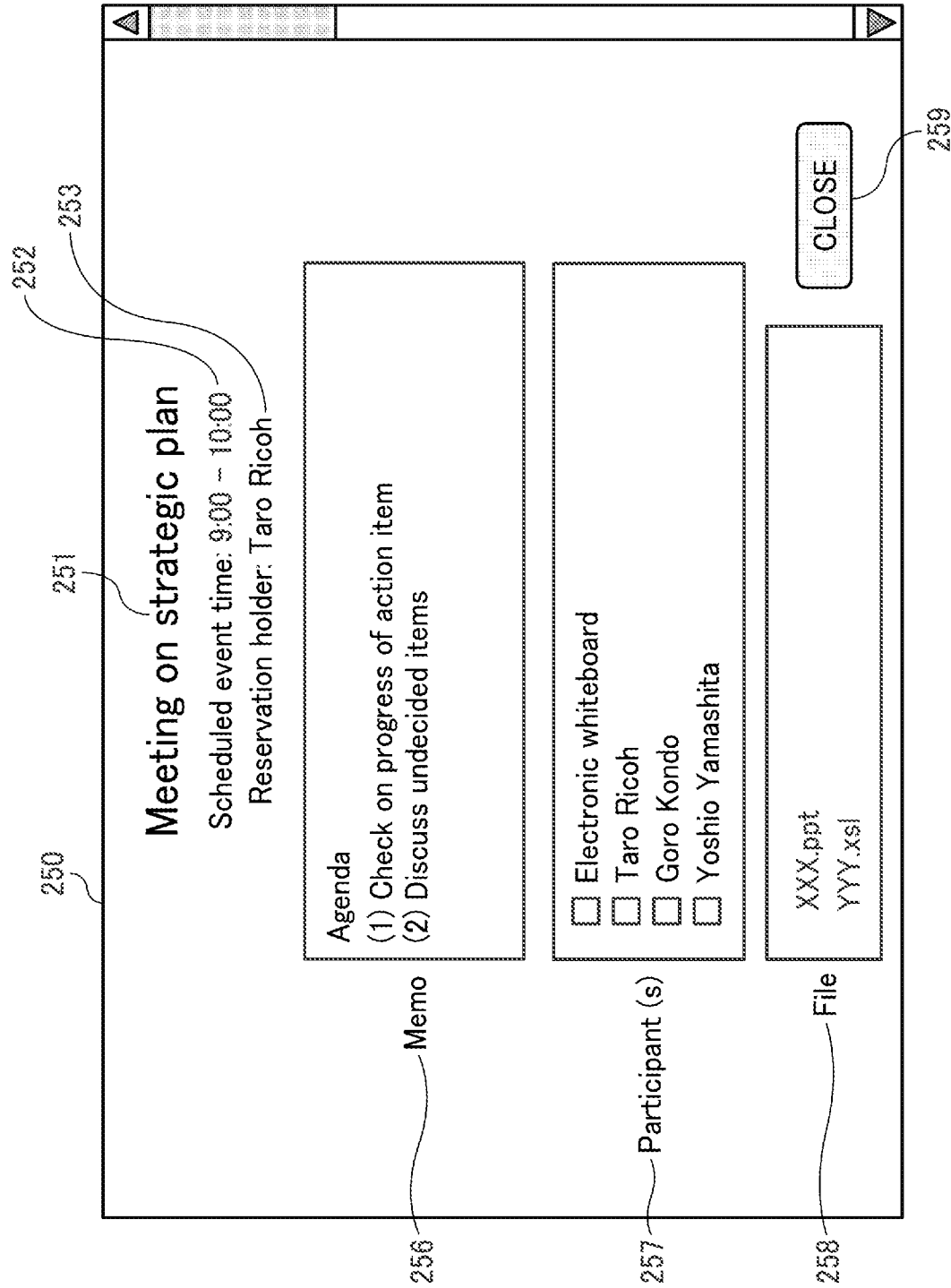
FIG. 34 is an example of event detailed information screen.

Then, as illustrated in FIG. 34, the display control unit 24 instructs the display 220 to display a detailed information screen 250 of the selected event (hereinafter, event detailed information screen 250) (step S64).

The event detailed information screen 250 includes, for example, a display area 251 used for displaying event name, a display area 252 used for displaying scheduled event execution time (scheduled start time and scheduled end time) of event, and a display area 253 used for displaying name of reservation holder.

Further, the event detailed information screen 250 includes a display area 256 used for displaying content of memo, a display area 257 used for displaying name of scheduled participant, and a display area 258 used for displaying identification information (e.g., file name) identifying file data stored in the specific storage area of the storage unit 2000.

The display area 257 displays the name of reservation holder and the name of selected other participant.

Further, the display area 258 displays a file name of file data stored in the specific storage area of the storage unit 2000, that is a file name of file data downloaded from the sharing assistant server 11, and also displays a file name of file data being downloaded from the sharing assistant server 11.

Further, the event detailed information screen 250 includes a "close" button 259 at the lower right portion of the event detailed information screen 250, which is to be pressed when the event detailed information screen 250 is closed.

Then, the other participant, who has received the participation request notice, sends or transmits a participation notification to the event from the user terminal 40 to the sharing assistant server 11, and participates an event such as an online meeting started by the reservation holder A (step S66). Then, the transmission/reception unit 61 of the sharing assistant server 11 receives the user ID of the other participant who has participated the event, such as the online meeting started by the reservation holder A.

Then, the sharing assistant server 11 inputs a mark of participation or absence of each participant in the column of participation or absence in the schedule management DB 6003 (see FIG. 9), that has not been input, and then stores and manages the participation or absence of each participant (step S67).

With this configuration, the reservation holder A and the other participant can start the event (e.g., online meeting) using the resource (e.g., conference room X) and the shared terminal 42. Then, the display control unit 24 instructs the display 220 to display an event execution screen.

(Processing During Event)

Hereinafter, a description is given of processing during an online meeting after starting the online meeting, which is an example of event. When an event such as an online meeting has started, the reservation holder A and other participant who are members of a project for collaboration work can hold the online meeting using a file sharing function, a screen sharing function, a voice call function, a video call function, a chat function, or the like provided by the collaboration system 10.

During the online meeting, the reservation holder A and other participants can use the chat function to transmit a message having a mention designating the shared terminal 42, from the user terminal 40 to the shared terminal 42, with which the function of the shared terminal 42 can be controlled from the user terminal 40, to be described later.

Figures 35, 36:
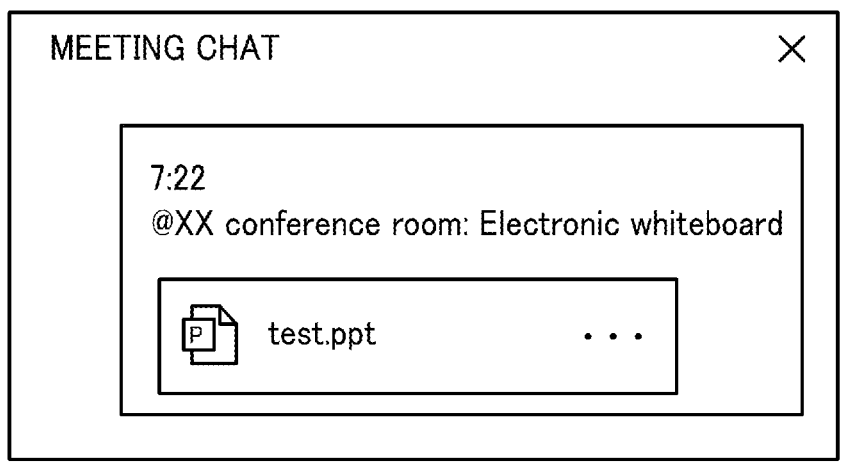
FIG. 35 is an example of correlation of message contents of chat function with operation contents (functions) of a shared terminal which can be controlled by the message contents.
FIG. 36 is an example of message content posted using a chat function.

FIG. 35 is an example of correlation of message contents of chat function with operation contents (functions) of the shared terminal 42, which can be controlled by the message contents. The message contents of FIG. 35 are contents of messages that are posted using the chat function, and may be text or an attached file.

Figure 37:
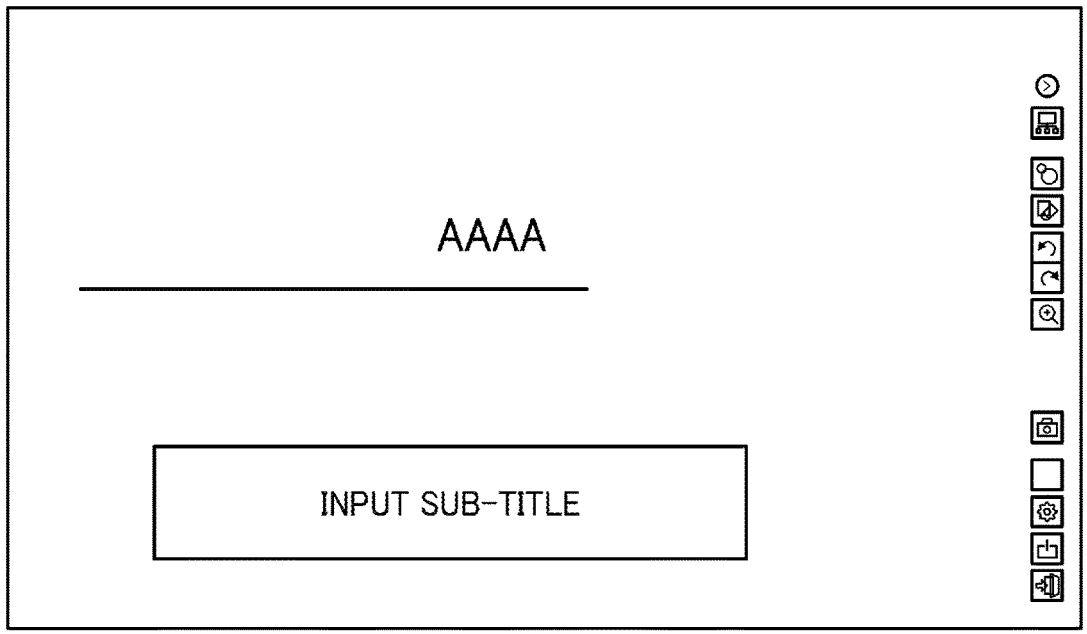
FIG. 37 is an example of a display screen of attached file.
Figure 38:
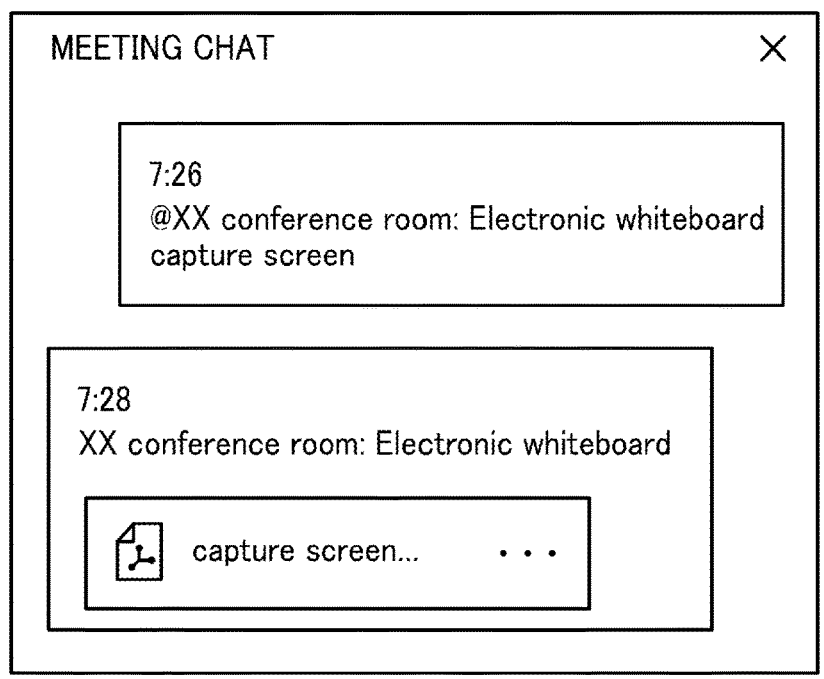
FIG. 38 is an example of message contents posted using a chat function.
Figure 39:
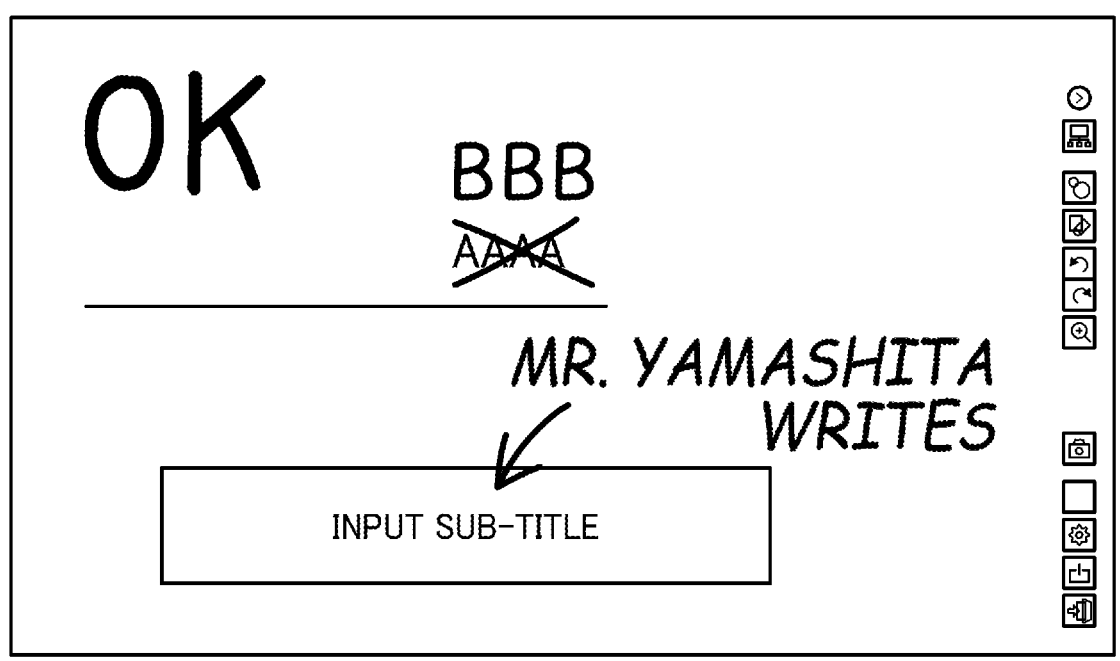
FIG. 39 is an example of screen image of a shared terminal.

For example, if the message contents of FIG. 35 are set, and a message content is attached with a file of "test.ppt" having a mention, such as "@xx conference room: electronic whiteboard" (see FIG. 36), as illustrated as a screen image in FIG. 37, the message content indicates a content of operation displaying the file of "test.ppt" of FIG. 36 on the shared terminal 42. FIG. 36 is an example of message content posted using the chat function. FIG. 37 is an example of a display screen of attached file. Further, if the message contents of FIG. 35 are set, and a message content is attached with a mention, such as "@xx conference room: electronic whiteboard" and a text of "capture screen" as illustrated in FIG. 38, the message content indicates a content of operation of capturing a screen including writing content (see screen image of FIG. 39), and a content of operation of posting the captured screen file, which is indicated as the message at the lower part in FIG. 38.

Further, if the message contents of FIG. 35 are set, and a message content is attached with a mention, such as "@xx conference room: electronic whiteboard" and a text of "view screen", the message content indicates a content of operation of sharing a display screen of the shared terminal 42 (see screen image of FIG. 40(*a*)), by members participating the same online meeting. FIG. 40 (40(*a*), 40(*b*)) is examples of a display screen of the shared terminal 42 and a camera image.

Further, if the message contents of FIG. 35 are set, and a message content is attached with a mention, such as "@xx conference room: electronic whiteboard" and a text of "view camera image", the message content indicates a content of operation of sharing a camera image of the shared terminal 42 (see screen image of FIG. 40(*b*)), by the members participating the same online meeting.

Further, the switching between the display image of FIG. 40(*a*) and the camera image of FIG. 40(*b*) can be performed by a button 580 set at the lower left corner of a screen displayed on the shared terminal 42 (see FIG. 40), in addition to a method using the chat function.

Figure 41:
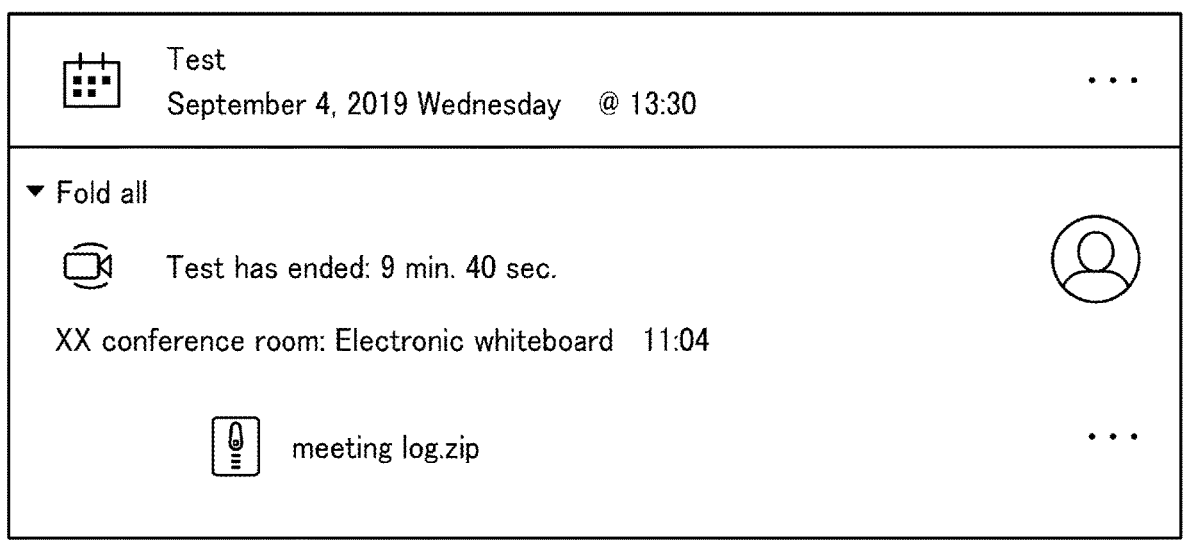
FIG. 41 is an example of message content posted using a chat function.

Further, if the message contents of FIG. 35 are set, and a message content includes text indicating an end of meeting, such as "test has ended" as illustrated in FIG. 41, the message content indicates a content of operation of posting a file of meeting log of "meeting log.zip", which is indicated as a message at the lower part in FIG. 41.

Figure 42:
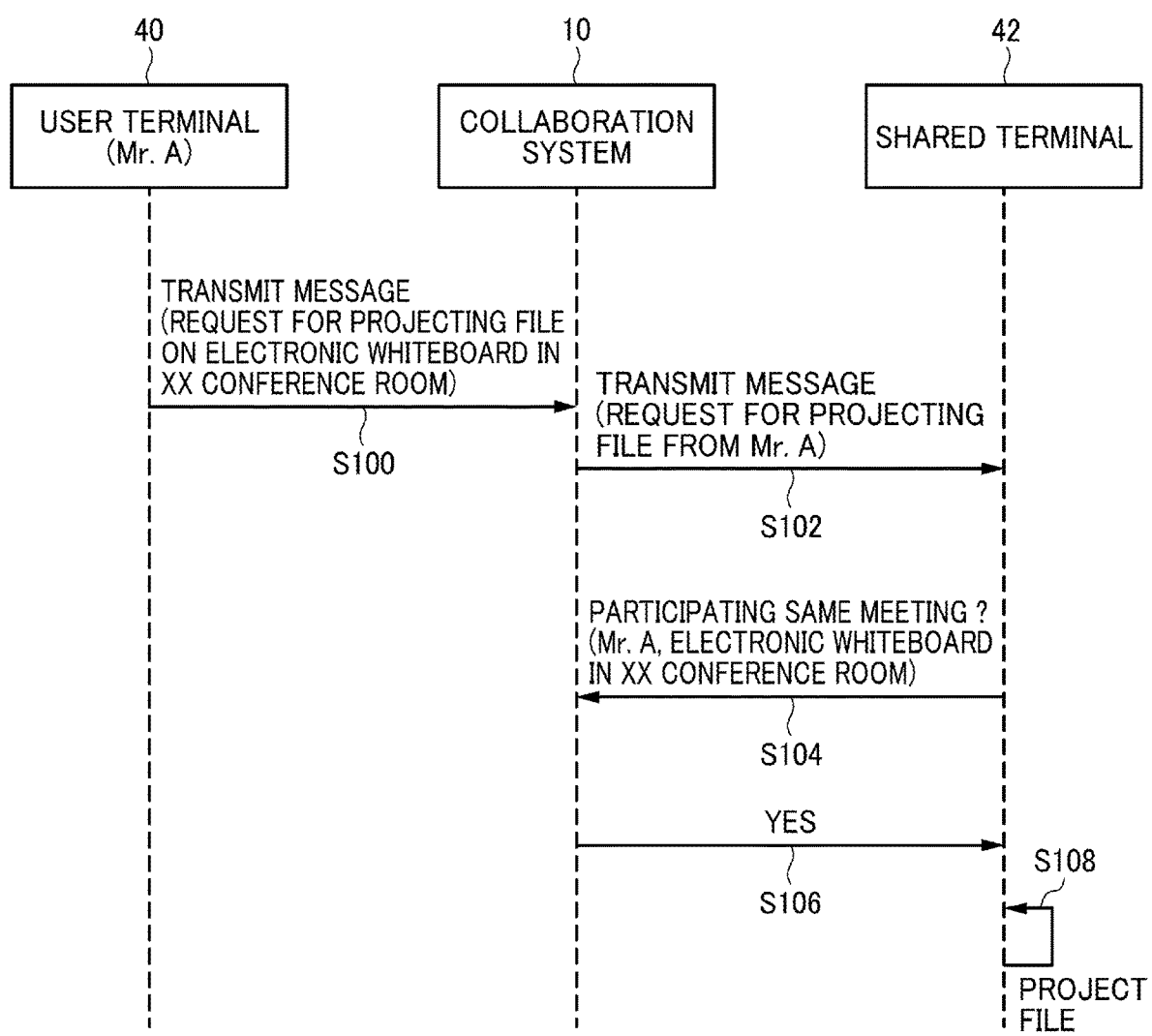
FIGS. 42 and 43 are sequence diagrams illustrating a process when a user requests a control of a shared terminal using a chat function.
Figure 43:
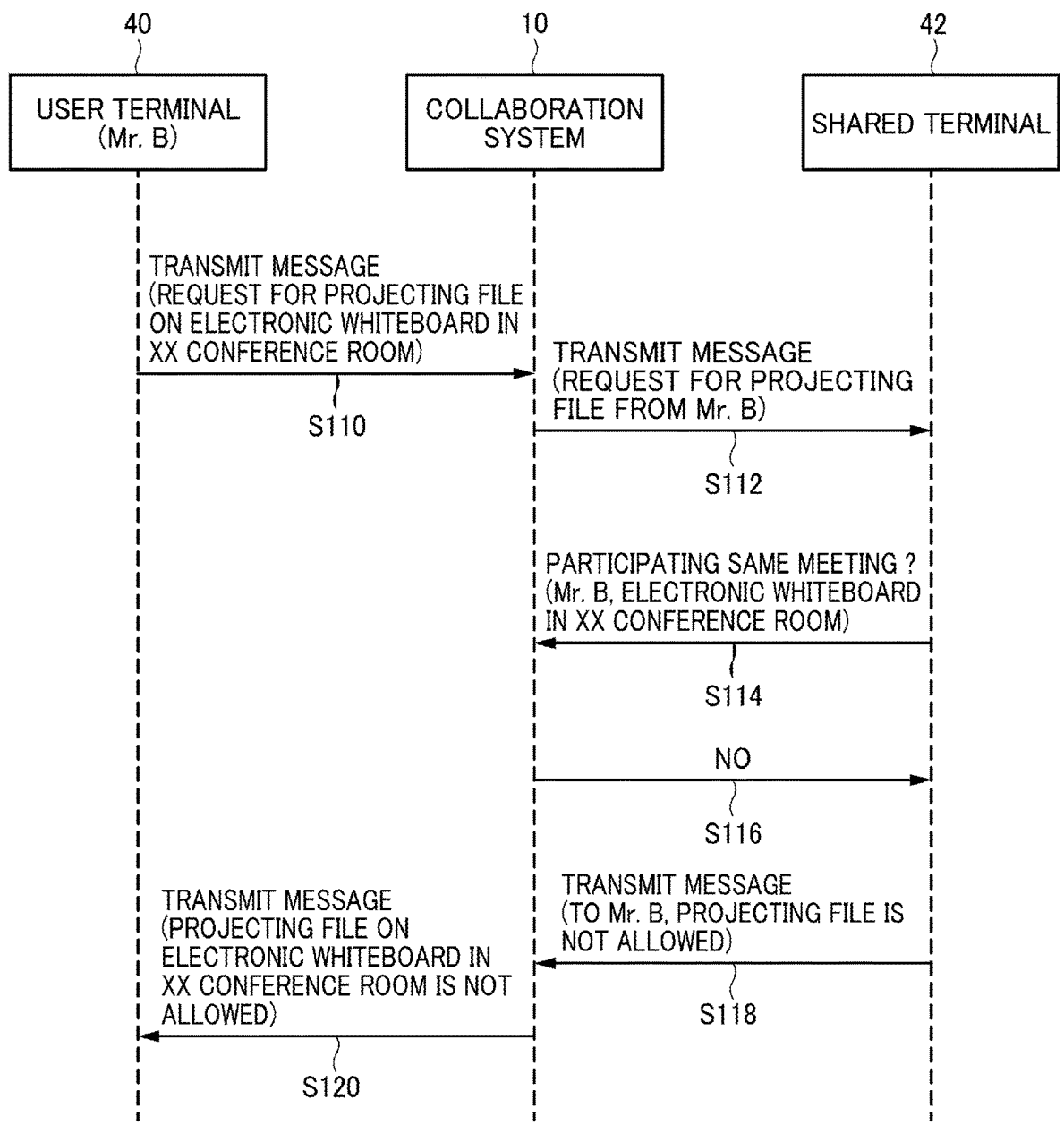

The processing for controlling the functions of the shared terminal 42 by the participant of the online meeting using the chat function and the configuration of FIG. 35 can be implemented by performing a processing procedure of sequence diagram illustrated in FIGS. 42 and 43.

FIGS. 42 and 43 are sequence diagrams illustrating a process when a user requests a control of the shared terminal 42 using a chat function.

The sequence diagram of FIG. 42 indicates an example, in which a control request of function of the shared terminal 42 using the chat function is received from a user (Mr. A) who participates the same online meeting as the shared terminal 42. Further, the sequence diagram of FIG. 43 indicates an example, in which a control request of function of the shared terminal 42 using the chat function is received from a user (Mr. B) who does not participate the same online meeting as the shared terminal 42.

As indicated in FIG. 42, if a user (Mr. A) designates the shared terminal 42 as a mention and transmits a chat message attached with a file to the collaboration system 10 using the user terminal 40, the user terminal 40 posts the chat message (step S100).

Then, the collaboration system 10 transmits the posted message having the mention to the shared terminal 42 (step S102). Then, since the mention of the received message designates the shared terminal 42, and the message is attached with the file, the shared terminal 42 determines that the shared terminal 42 has received a request of displaying (projecting) the file.

Then, the determination unit 25 of the shared terminal 42 inquires the collaboration system 10 whether or not the user (Mr. A) who has posted the message received in step S102 is participating the same online meeting that the shared terminal 42 has participated (step S104). For example, the shared terminal 42 transmits identification information of the user (Mr. A) who has posted the message to the collaboration system 10.

The collaboration system 10 includes, for example, the schedule management table (see FIG. 9) in the storage unit 6000 of the sharing assistant server 11. The schedule management table stores reservation holder name of online meeting, user ID of reservation holder, name of other participant, and user ID of other participant.

The collaboration system 10 determines whether the received identification information of the user is included in the identification information of the reservation holder and other participant stored in the schedule management table. If the collaboration system 10 determines that the received identification information of the user is included in the identification information of the reservation holder and other participant stored in the schedule management table, the collaboration system 10 determines that the user corresponding to the received identification information is participating the same online meeting.

Since FIG. 42 indicates an example case that the user A has participated the same online meeting, the collaboration system 10 returns information of "Yes" indicating that the user A has participated the same online meeting to the shared terminal 42 (step S106).

Since the user (Mr. A) who has posted the message is participating the same online meeting of the shared terminal 42, the function control unit 31 of the shared terminal 42 performs a control of displaying (projecting) the file attached to the message received in step S102 (step S108).

As to the sequence diagram of FIG. 42, the user can operate the shared terminal 42 from the user terminal 40 by sending or transmitting the message using the chat function to the shared terminal 42 participating the same online meeting.

As indicated in FIG. 43, if a user (Mr. B) designates the shared terminal 42 as a mention and transmits a chat message attached with a file to the collaboration system 10 using the user terminal 40, the user terminal 40 posts the chat message (step S110).

Then, the collaboration system 10 transmits the posted message having the mention to the shared terminal 42 (step S112). Then, since the mention of the received message designates the shared terminal 42, and the message is attached with the file, the shared terminal 42 determines that the shared terminal 42 has received a request of displaying (projecting) the file.

Then, the determination unit 25 of the shared terminal 42 inquires the collaboration system 10 whether or not the user (Mr. B) who has posted the message received in step S102 is participating the same online meeting that the shared terminal 42 has participated (step S114).

Since FIG. 43 indicates an example case that the user B has not participated the same online meeting, the collaboration system 10 returns information of "No" indicating that the user B has not participated the same online meeting to the shared terminal 42 (step S116).

Since the user (Mr. B) who has posted the message is not participating the same online meeting of the shared terminal 42, the function control unit 31 of the shared terminal 42 performs a control of not displaying (projecting) the file attached to the message received in step S112.

Figures 44, 45:
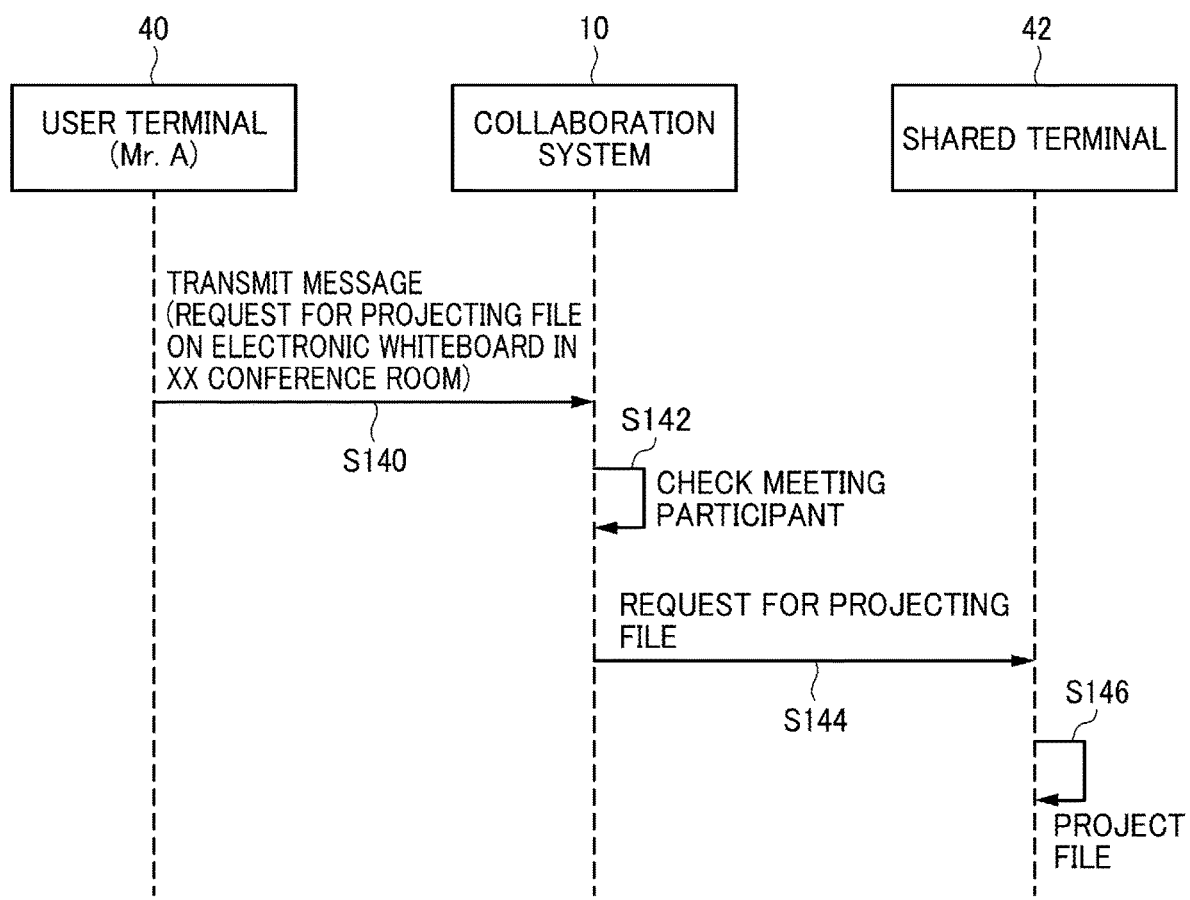
FIG. 44 is an example of message contents posted using a chat function.
FIGS. 45 and 46 are sequence diagrams illustrating a process when a user requests a control of a shared terminal using a chat function.

Then, the determination unit 25 posts, for example, a message content illustrated in FIG. 44 designating the user (Mr. B) as a mention (step S118).

FIG. 44 is an example of message content posted using the chat function. In an example of FIG. 44, a message including a mention such as "@Mr. B" and text of "you cannot operate electronic whiteboard in xx conference room because you are not participating the same meeting of the electronic whiteboard" is set and transmitted.

Then, the collaboration system 10 transmits the posted message having the mention to the user terminal 40 operated by the user (Mr. B) (step S120). Since the user (Mr. B) is not participating the online meeting that the shared terminal 42 has participated as indicated by the message contents of FIG. 44, the user (Mr. B) can confirm that the file attached to the message posted in step S110 is not displayed (projected) on the shared terminal 42.

As to the sequence diagram of FIG. 43, an operation of the shared terminal 42 using the chat function from a user who does not participate the same online meeting can be rejected.

In the sequence diagrams illustrated in FIGS. 42 and 43, the shared terminal 42 determines that the request is a displaying (projecting) of the attached file from the received message content, but is not limited thereto. For example, the collaboration system 10 can determine that the request is a displaying (projecting) of the attached file as illustrated in sequence diagrams illustrated in FIGS. 45 and 46.

Figure 46:
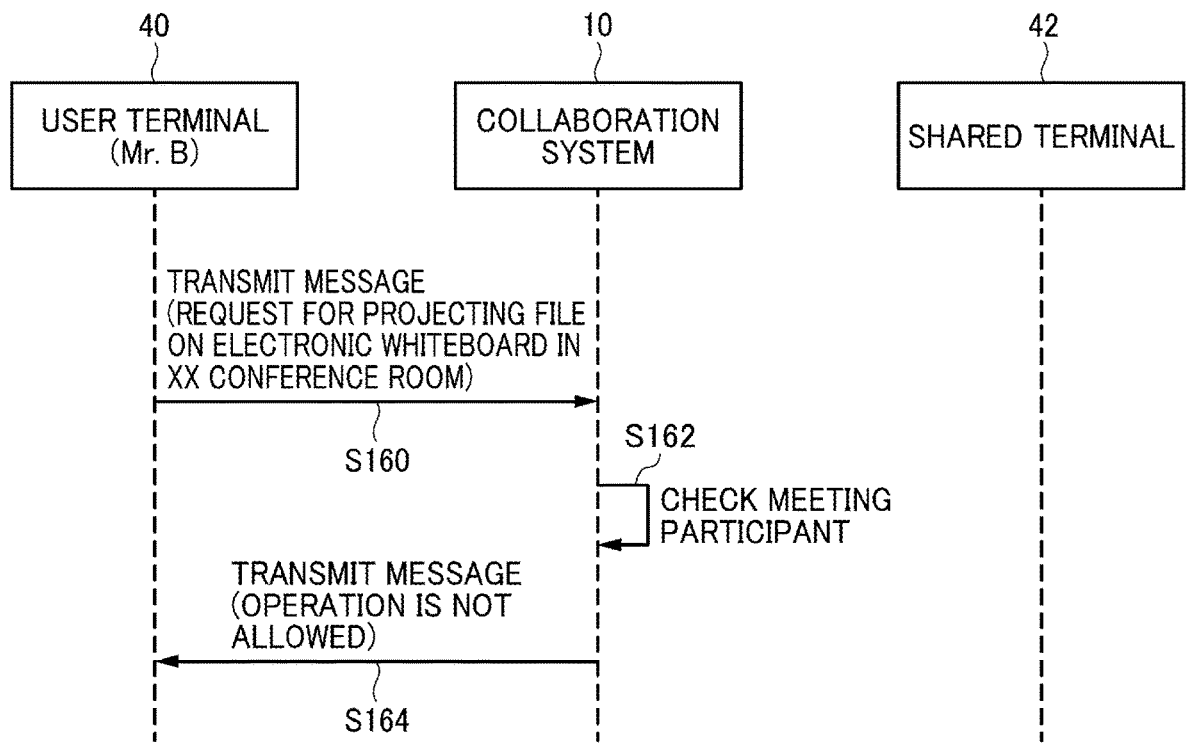

FIGS. 45 and 46 are sequence diagrams illustrating a process when a user requests a control of the shared terminal 42 using a chat function.

The sequence diagram of FIG. 45 indicates an example, in which a control request of function of the shared terminal 42 using the chat function is received from a user (Mr. A) who participates the same online meeting as the shared terminal 42. Further, the sequence diagram of FIG. 46 indicates an example, in which a control request of function of the shared terminal 42 using the chat function is received from a user (Mr. B) who does not participate the same online meeting as the shared terminal 42.

As indicated in FIG. 45, if a user (Mr. A) designates the shared terminal 42 as a mention and transmits a chat message attached with a file to the collaboration system 10 using the user terminal 40, the user terminal 40 posts the chat message (step S140).

Then, since the mention of the received message designates the shared terminal 42, and the message is attached with the file, the determination unit 65 of the collaboration system 10 deter nines that the request is a request for displaying (projecting) of the attached file. Further, the determination unit 65 can determine the type of operation request using a correlation table (see FIG. 35) that associates the message contents with the operation contents (functions) of the shared terminal 42 that can be controlled by the message contents.

Then, the determination unit 65 checks whether the user (Mr. A) who has posted the message received in step S140 is participating the online meeting that the shared terminal 42 has participated (step S142). Since FIG. 45 indicates an example that the user (Mr. A) and the shared terminal 42 have participated the same online meeting, the determination unit 65 determines that the user (Mr. A) and the shared terminal 42 are participating the same online meeting.

Since the user (Mr. A) who has posted the message is participating the same online meeting of the shared terminal 42, the control request unit 67 of the collaboration system 10 requests the shared terminal 42 performs a control of displaying (projecting) the file attached to the message received in step S140 (step S144).

Then, the function control unit 31 of the shared terminal 42 performs a control of displaying (projecting) of the file attached to the message received in step S140 in accordance with the control request in step S144 (step S146).

As to the sequence diagram of FIG. 45, the user can operate the shared terminal 42 from the user terminal 40 by sending or transmitting the message using the chat function to the shared terminal 42 participating the same online meeting.

As indicated in FIG. 46, if a user (Mr. B) designates the shared terminal 42 as a mention and transmits a chat message attached with a file to the collaboration system 10 using the user terminal 40, the user terminal 40 posts the chat message (step S160).

Then, since the mention of the received message designates the shared terminal 42, and the message is attached with the file, the determination unit 65 of the collaboration system 10 determines that the request is a request for displaying (projecting) of the attached file.

Then, the determination unit 65 checks whether the user (Mr. B) who has posted the message received in step S160 is participating the online meeting that the shared terminal 42 has participated (step S162). Since FIG. 46 indicates an example case that the user B has not participated the same online meeting, the determination unit 65 determines that the user (user B) is not participating the same online meeting.

Since the user (Mr. B) who has posted the message is not participating the online meeting that the shared terminal 42 has participated, the collaboration system 10 transmits, for example, a message having a mention (see FIG. 44) to the user terminal 40 operated by the user (Mr. B) (step S164). Since the user (Mr. B) is not participating the online meeting that the shared terminal 42 has participated as indicated by the message contents of FIG. 44, the user (Mr. B) can confirm that the file attached to the message posted in step S160 is not displayed (projected) on the shared terminal 42.

As to the sequence diagram of FIG. 46, an operation of the shared terminal 42 using the chat function from a user who does not participate the same online meeting can be rejected.

Modification of System

Although the above described embodiment has described a case where a message displayed on a chat screen is used, but a message transmitted internally in the system (not displayed on the chat screen) may be used. Further, the above described embodiment can be also implemented using a message transmission function different from the chat function.

Figure 47:
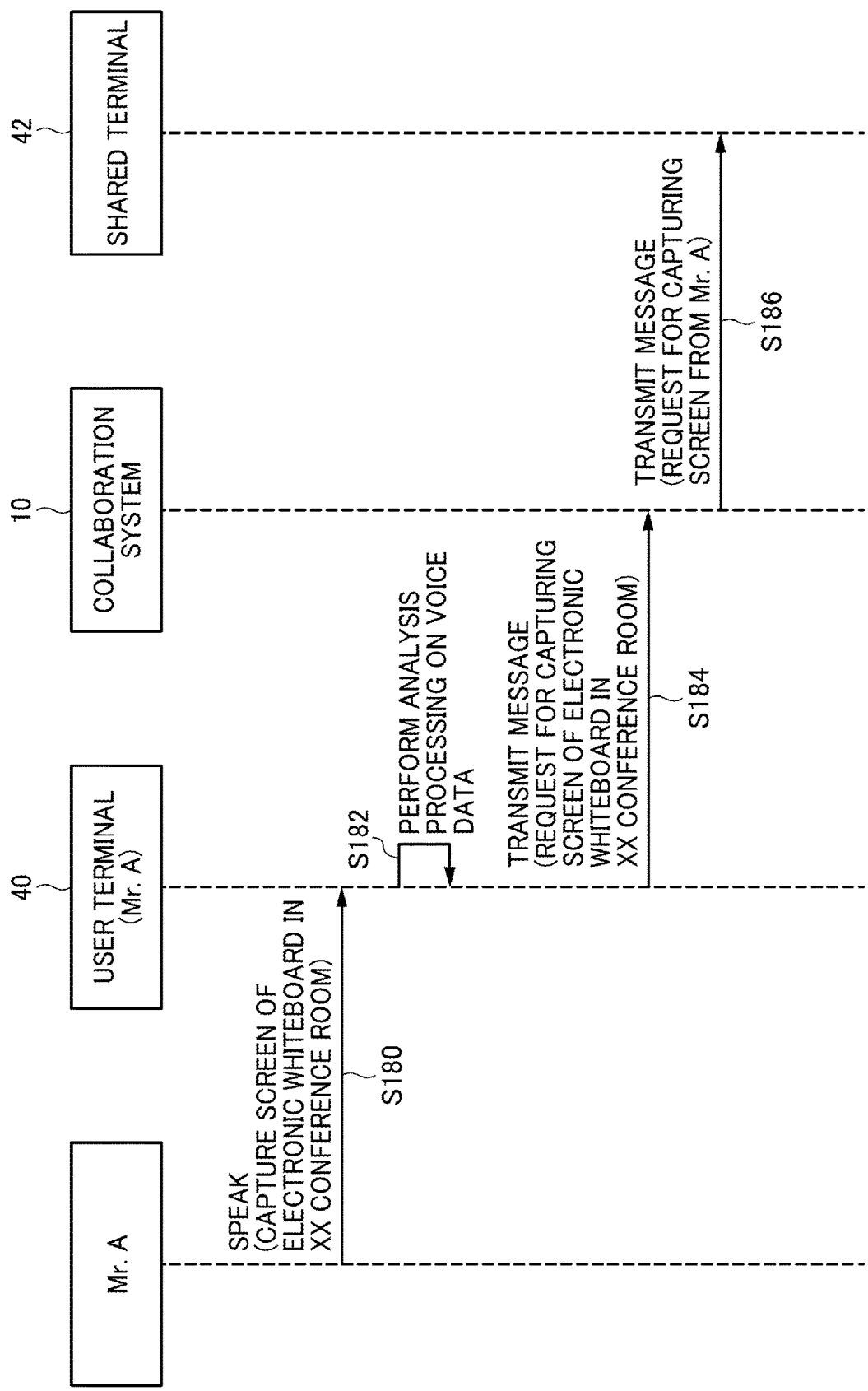
FIG. 47 is an example sequence diagram illustrating a process when a user requests a control of a shared terminal 42 using voice.

Although the text chat is described in the above embodiment, the shared terminal 42 can be operated, for example, using voice. FIG. 47 is an example sequence diagram illustrating a process when a user requests a control of the shared terminal 42 using voice. The sequence diagram of FIG. 47 indicates an example, in which a control request of function of the shared terminal 42 using the chat function is received from a user (Mr. A) who has participated the same online meeting of the shared terminal 42.

As indicated in FIG. 47, the user (Mr. A) who operates the user terminal 40 speaks "capture screen of electronic whiteboard in xx conference room" (step S180).

Then, the user terminal 40 operated by the user (Mr. A) performs voice analysis processing on voice data to convert the voice data into text data (step S182).

Then, the user terminal 40 uses the text data converted from the voice data by performing the voice analysis processing in step S182 to transmit a chat message designating the shared terminal 42 as a mention and attached with a file to the collaboration system 10 to post the chat message (step S184).

Then, the collaboration system 10 transmits the posted message having the mention to the shared terminal 42 (step S186).

Since the processing after step S186 is the same as the processing after step S102 in FIG. 42, the description thereof will be omitted. In FIG. 47, the user terminal 40 performs the voice analysis processing on the voice data, but the collaboration system 10 can be configured to perform the voice analysis processing on the voice data.

Further, for example, by using the voice chat function, a voice message may be posted, and the voice analysis processing may be performed by the collaboration system 10 or the shared terminal 42 to determine the type of operation request from the message content.

Further, for example, after ending the above-described online meeting, as illustrated at the lower part of FIG. 41, the meeting log is posted as a file includes, for example, a screen capture including the contents written at the time of ending the online meeting, and audio data/video data recorded using the microphone 2200 and the camera 2400.

Further, after ending the online meeting, the power supply of the shared terminal 42 may be turned off, or all the written contents may be deleted. As described above, no problem occurs as long as the power supply is turned off or the written content is deleted after ending the online meeting. However, if the power supply is turned off or the written content is deleted during the online meeting, the meeting log cannot be posted correctly.

Figure 48:
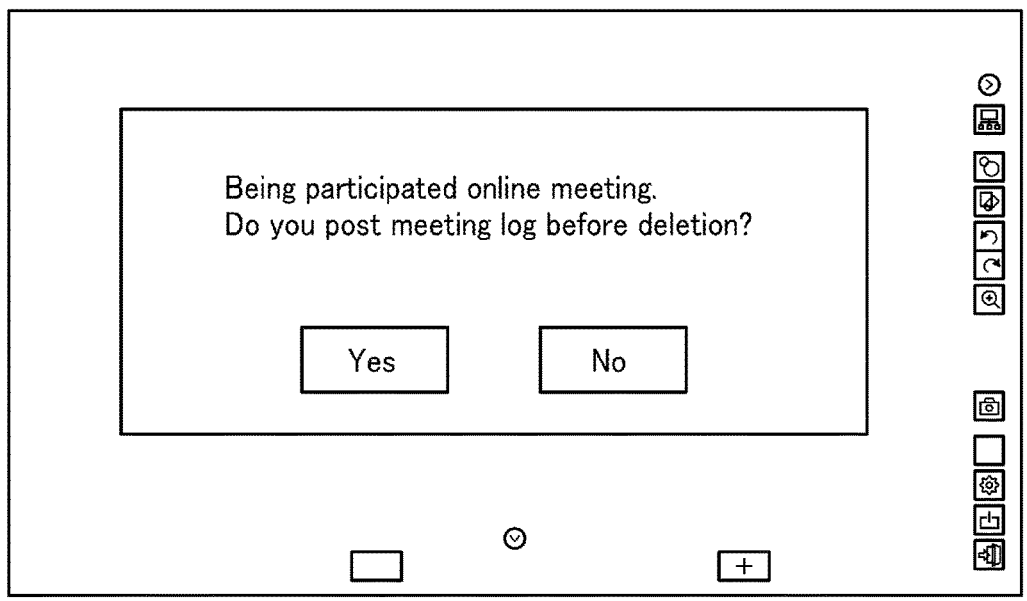
FIG. 48 is an example of screen image of a shared terminal.
Figure 49:
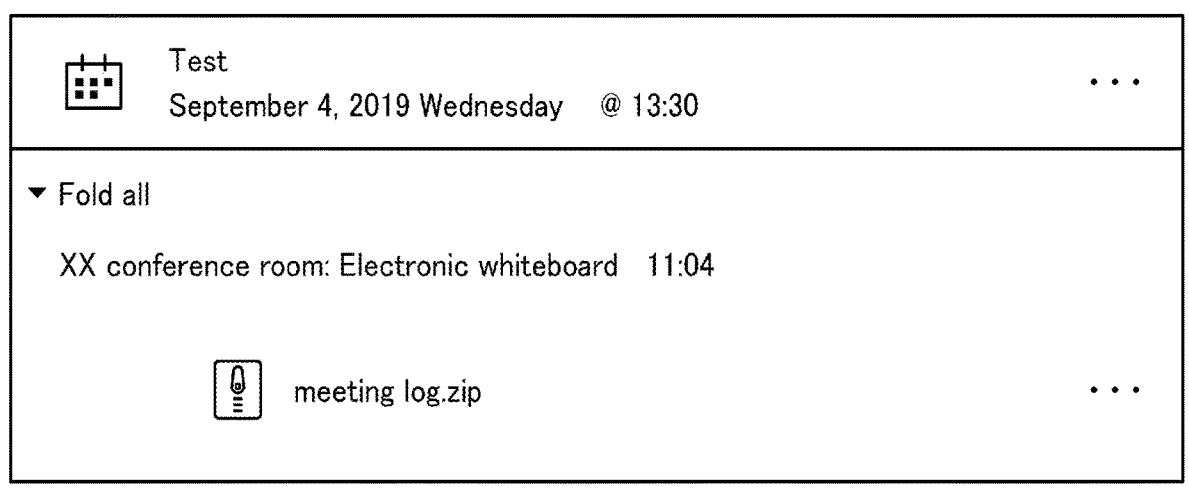
FIG. 49 is an example of message contents posted using a chat function.

Therefore, when the shared terminal 42 receives an operation of turning off the power supply or deleting the written contents (e.g., deleting all information or deleting pages) from a user during the online meeting, the shared terminal 42 may display a user interface (UI) illustrated in FIG. 48 to request the user to confirm whether or not to post the meeting log to the chat. By using the UI illustrated in FIG. 48, even if the shared terminal 42 receives the power-off operation or written content deletion operation from the user during the online meeting, the shared terminal 42 can post the file of meeting log as illustrated in FIG. 49.

The above described embodiment is also implemented as an information processing apparatus connectable to a plurality of user terminals and a shared terminal via a network. The information processing apparatus includes circuitry configured to receive text data transmitted and received between the plurality of user terminals; determine whether or not the received text data includes a request for controlling the shared terminal; and request, to the shared tell final, controlling the shared terminal based on a determination that the text data includes the request for controlling the shared terminal.

The above described embodiment is also implemented as a user terminal connectable to a shared terminal, an information processing apparatus, and another user terminal via a network. The user terminal includes circuitry configured to receive an input of text data to be transmitted to the another user terminal; determine whether or not the received text data includes a request for controlling the shared terminal; and request, to the information processing apparatus, for controlling the shared terminal based on a determination that the text data includes the request for controlling the shared terminal.

The above described embodiment is also implemented as a method of processing information performable by a shared terminal connectable to a plurality of user terminals and an information processing apparatus via a network. The method includes receiving text data transmitted and received between the plurality of user terminals; determining whether or not the received text data includes a request for controlling the shared terminal; and controlling the shared terminal based on a determination that the text data includes the request for controlling the shared terminal.

The above described embodiment is also implemented as a method of processing information performable by an information processing apparatus connectable to a plurality of user terminals and a shared terminal via a network. The method includes receiving text data transmitted and received between the plurality of user terminals; determining whether or not a request for controlling the shared terminal is included in the received text data; and requesting, to the shared terminal, controlling of the shared terminal based on a determination that the text data includes the request for controlling the shared terminal.

The above described embodiment is also implemented as a non-transitory computer readable storage medium storing one or more instructions that, when executed by one or more processors, cause the one or more processors to perform a method of processing information performable by a shared terminal connectable to a plurality of user terminals and an information processing apparatus via a network. The method includes receiving text data transmitted and received between the plurality of user terminals; determining whether or not the received text data includes a request for controlling the shared terminal; and controlling the shared terminal based on a determination that the text data includes the request for controlling the shared terminal.

The above described embodiment is also implemented as a non-transitory computer readable storage medium storing one or more instructions that, when executed by one or more processors, cause the one or more processors to perform a method of processing information performable by an information processing apparatus connectable to a plurality of user terminals and a shared terminal via a network. The method includes receiving text data transmitted and received between the plurality of user terminals; determining whether or not a request for controlling the shared terminal is included in the received text data; and requesting, to the shared terminal, controlling of the shared terminal based on a determination that the text data includes the request for controlling the shared terminal.

The above described embodiment is also implemented as a non-transitory computer readable storage medium storing one or more instructions that, when executed by one or more processors, cause the one or more processors to perform a method of processing information performable by a user terminal connectable to a shared terminal, an information processing apparatus, and another user terminal via a network. The method includes receiving an input of text data to be transmitted to the another user terminal; determining whether or not the received text data includes a request for controlling the shared terminal; and requesting, to the information processing apparatus, for controlling the shared terminal based on a determination that the text data includes the request for controlling the shared terminal.

As to the above described embodiment of this disclosure, when users and a shared terminal participate the same event, a text data transmission-reception system can assist or support each user to operate the shared terminal.

Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above. For example, a configuration that combines the first embodiment and modification can be applied. The information processing system 1 described in the above described embodiment is just one example, and there are various system configurations depending on applications and purposes.

Each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The group of apparatuses or devices described in the above embodiment only represents one of a plurality of computing environments for implementing the embodiment disclosed herein.

In one embodiment, the sharing assistant server 11 and the schedule management server 12 may include a plurality of computing devices, such as server clusters. The plurality of computing devices are configured to communicate with each other over any type of communication link, including the communication network 50, shared memory, or the like, to perform the processing disclosed herein.

Further, the sharing assistant server 11, the schedule management server 12, the voice-to-text conversion server 13, the file management server 14, the user terminal 40, and the shared terminal 42 can be configured to share the processing steps disclosed herein in various combinations. For example, a process performable by a given unit may be performable by other unit. Similarly, the function performable by a given unit may be performable by other unit. Further, each of the functional units of the sharing assistant server 11, the schedule management server 12, the voice-to-text conversion server 13, and the file management server 14 may be integrated into one apparatus or may be divided into a plurality of apparatuses.

The collaboration system 10 is an example of collaboration work assistant system. The management unit 84 is an example of management unit. The message and voice message of the chat function are examples of voice data, spoken data, or statement data. The distribution unit 66 is an example of distribution unit. The function control unit 31 is an example of function control unit. The storage request unit 32 is an example of storage request unit. The schedule input screen 550 is an example of setting screen. The determination unit 25 is an example of determination unit. The control request unit 67 is an example of control request unit. The information processing system 1 is an example of text data transmission-reception system or data transmission-reception system. The collaboration system 10 is an example of information processing apparatus. The transmission/reception unit 51 is an example of transmission/reception unit. The function control unit 31 is an example of control unit. The storage unit 6000 is an example of storage unit. The camera 2400 is an example of image capture device.

What is claimed is:

1. An audio data transmission-reception system comprising:
   a plurality of user terminals;
   one or more shared terminals; and
   an information processing apparatus connectable to each of the plurality of user terminals and the one or more shared terminals via a network, the information processing apparatus including circuitry configured to
   receive and transmit audio data between the plurality of user terminals, said audio data being input by users of the plurality of the user terminals;
   perform a voice analysis processing for the audio data that is input by the users and received and transmitted between the plurality of user terminals,
   determine whether or not the audio data transmitted and received between the plurality of user terminals includes shared terminal that is identified based on the audio data among the one or more shared terminals and a message regarding an operation of the shared terminal; and
   control the shared terminal to perform the operation upon determining that the audio data includes the shared terminal and the message regarding the operation of the shared terminal.

2. The audio data transmission-reception system according to claim 1,
   wherein the circuitry controls or not control the shared terminal based on a result of determining whether a particular user who has transmitted the audio data from one of the user terminals is participating an event related to the audio data transmitted and received between the user terminals,
   wherein the circuitry controls the shared terminal if the particular user who has transmitted the audio data from one of the user terminals is participating the event, and
   wherein the circuitry does not control the shared terminal if the particular user who has transmitted the audio data from one of the user terminals is not participating the event.

3. The audio data transmission-reception system according to claim 2,
   wherein the circuitry determines whether identification information of the particular user who has transmitted the audio data from one of the plurality of user terminals is included in identification information of persons to participate the event, and
   wherein the circuitry controls the shared terminal when the circuitry determines that the identification information of the particular user who has transmitted the audio data from one of the plurality of user terminals is included in the identification information of persons to participate the event, and
   wherein the circuitry does not control the shared terminal when the circuitry determines that the identification information of the particular user who has transmitted the audio data from one of the plurality of user terminals is not included in the identification information of persons to participate the event.

4. The audio data transmission-reception system according to claim 2, further comprising:
   one or more memories that store shared data including audio data used in the event.

5. The audio data transmission-reception system according to claim 4,
   wherein the one or more memories store the shared data while performing a particular event related to the audio data transmitted and received between the plurality of user terminals or after ending the particular event related to the audio data transmitted and received between the plurality of user terminals.

6. The audio data transmission-reception system according to claim 5,
   wherein the circuitry stores, in the one or more memories, event information including information on one or more users who transmit and receive the audio data between the plurality of user terminals, and information on the shared terminal.

7. The audio data transmission-reception system according to claim 1,
   wherein the circuitry controls the shared terminal using at least one of control modes including
   a control of acquiring a screen to be displayed on a display of the shared terminal,
   a control of displaying a screen of the shared terminal, captured by an image capture device, on a display of each of the plurality of user terminals, and
   a control of storing shared data used in the event related to the audio data transmitted and received between the plurality of user terminals.

8. The audio data transmission-reception system according to claim 1,
   wherein the circuitry is further configured to:
   in response to a determination that the audio data includes the request, cause control the shared terminal to perform a process which is based on the request.

9. The audio data transmission-reception system according to claim 1,
   wherein the circuitry is further configured to:
   receive, via the network, audio data including a message, the audio data being transmitted and received between the plurality of user terminals;
   determine whether or not the message included in the audio data transmitted and received between the plurality of user terminals via the network includes one of a plurality of predetermined messages, each the predetermined messages being associated with each process to perform; and
   in response to a determination that the message includes one of the plurality of predetermined messages, cause the shared terminal to perform a process associated with the message.

10. The audio data transmission-reception system according to claim 1, wherein the information processing apparatuses determines whether or not the identification information of a user who inputs the audio data is included in a database that is managed by the information processing apparatuses, and controls the shared terminal to perform the operation to upon further determining that the identification information of the user is included in the database.

11. A shared terminal connectable to a plurality of user terminals and an information processing apparatus via a network, the shared terminal comprising circuitry configured to:
receive the audio data that is input by users of the plurality of user terminals, and transmitted and received between the plurality of user terminals;
perform a voice analysis processing for the audio data that is input by the users and received and transmitted between the plurality of user terminals,
determine whether or not the audio data includes a shared terminal that is identified based on the audio data among one or more shared terminals and a message regarding an operation of the shared terminal; and
control the shared terminal to perform the operation upon determining that the audio data includes the shared terminal and the message regarding the operation of the shared terminal.

12. A method of processing information performable by a user terminal, an information processing apparatus, and another user terminal via a network, the method comprising:
receiving an input of the audio data to be transmitted to the another user terminal;
performing a voice analysis processing for the audio data that is input by the users and received and transmitted between the plurality of user terminals,
determining whether or not the audio data includes a shared terminal that is identified based on the audio data among one or more shared terminals and a message regarding an operation of the shared terminal; and
requesting, to the information processing apparatus, for controlling the shared terminal to perform the operation upon determining that the audio data includes the shared terminal and the message regarding the operation of the shared terminal.

13. An information processing apparatus connectable to each of a plurality of user terminals, the information processing apparatus including circuitry configured to
receive audio data that is input by users, transmitted and received between the plurality of user terminals;
perform a voice analysis processing for the audio data that is input by the users and received and transmitted between the plurality of user terminals, determine whether or not the audio data transmitted and received between the plurality of user terminals includes shared terminal that is identified based on the audio data among one or more shared terminals and a message regarding an operation of the shared terminal; and
control the shared terminal to perform the operation upon determining that the audio data includes the shared terminal and the message regarding the operation of the shared terminal.

14. The information processing apparatus according to claim 13,
wherein the circuitry controls or not control the shared terminal based on a result of determining whether a particular user who has transmitted the audio data from one of the user terminals is participating an event related to the text data transmitted and received between the user terminals,
wherein the circuitry controls the shared terminal if the particular user who has transmitted the audio data from one of the user terminals is participating the event, and
wherein the circuitry does not control the shared terminal if the particular user who has transmitted the audio data from one of the user terminals is not participating the event.

15. The information processing apparatus according to claim 14,
wherein the circuitry determines whether identification information of the particular user who has transmitted the audio data from one of the plurality of user terminals is included in identification information of persons to participate the event, and
wherein the circuitry controls the shared terminal when the circuitry determines that the identification information of the particular user who has transmitted the audio data from one of the plurality of user terminals is included in the identification information of persons to participate the event, and
wherein the circuitry does not control the shared terminal when the circuitry determines that the identification information of the particular user who has transmitted the audio data from one of the plurality of user terminals is not included in the identification information of persons to participate the event.

16. The information processing apparatus according to claim 14,
further comprising:
one or more memories that store shared data including audio data used in the event.

17. The information processing apparatus according to claim 16,
wherein the one or more memories store the shared data while performing a particular event related to the audio data transmitted and received between the plurality of user terminals or after ending the particular event related to the text data transmitted and received between the plurality of user terminals.

18. The information processing apparatus according to claim 17,
wherein the circuitry stores, in the one or more memories, event information including information on one or more users who transmit and receive the audio data between the plurality of user terminals, and information on the shared terminal.

19. The information processing apparatus according to claim 13,
wherein the circuitry controls the shared terminal using at least one of control modes including
a control of acquiring a screen to be displayed on a display of the shared terminal,
a control of displaying a screen of the shared terminal, captured by an image capture device, on a display of each of the plurality of user terminals, and
a control of storing shared data used in the event related to the audio data transmitted and received between the plurality of user terminals.

20. The information processing apparatus according to claim 13,
wherein the circuitry is further configured to:
in response to a determination that the audio data includes the request, cause control the shared terminal to perform a process which is based on the request.

21. The information processing apparatus according to claim 13,
wherein the circuitry is further configured to:
receive, via the network, audio data including a message, the audio data being transmitted and received between the plurality of user terminals;
determine whether or not the message included in the audio data transmitted and received between the plurality of user terminals via the network includes one of a plurality of predetermined messages, each the predetermined messages being associated with each process to perform; and
in response to a determination that the message includes one of the plurality of predetermined messages, cause the shared terminal to perform a process associated with the message.

* * * * *